United States Patent [19]
Blacker

[11] Patent Number: 5,315,537
[45] Date of Patent: May 24, 1994

[54] AUTOMATED QUADRILATERAL SURFACE DISCRETIZATION METHOD AND APPARATUS USABLE TO GENERATE MESH IN A FINITE ELEMENT ANALYSIS SYSTEM

[76] Inventor: Teddy D. Blacker, 12205 Kashmir, N.E., Albuquerque, N. Mex. 87111

[21] Appl. No.: 682,838

[22] Filed: Apr. 8, 1991

[51] Int. Cl.⁵ .............................................. G06F 15/20
[52] U.S. Cl. ..................... 364/570; 364/578; 395/123
[58] Field of Search ................. 364/570, 578; 395/123

[56] References Cited

U.S. PATENT DOCUMENTS

| | | | |
|---|---|---|---|
| 4,072,282 | 2/1978 | Fulker et al. | 244/35 R |
| 4,257,690 | 3/1981 | Howland | 351/32 |
| 4,268,861 | 5/1981 | Schreiber et al. | 358/138 |
| 4,384,768 | 5/1983 | Guzman | 353/20 |
| 4,771,192 | 9/1988 | Jackson | 307/493 |
| 4,875,097 | 10/1989 | Jackson | 358/180 |
| 4,912,664 | 3/1990 | Weiss et al. | 364/577 |
| 4,930,010 | 5/1990 | MacDonald | 358/78 |
| 4,933,889 | 6/1990 | Meshkat et al. | 364/578 |
| 4,941,114 | 7/1990 | Shigyo et al. | 364/578 |
| 4,958,272 | 9/1990 | Wake | 364/518 |
| 4,969,116 | 11/1990 | Wada et al. | 364/578 |
| 5,125,038 | 6/1992 | Meshkat et al. | 364/578 X |
| 5,214,752 | 5/1993 | Meshkat et al. | 395/123 |

OTHER PUBLICATIONS

Herrmann: "Laplacian-Isoparametric Grid Generation Scheme"; Journal of Engineering Mechanics, Oct. 1979 pp. 749-756.

A. J. G. Schoofs et al.; A General Purpose Two-Dimensional Mesh Generator; 1979; pp. 131-136.

Kellyn Betts; (CIME) Adaptivity Reshapes Fe Analysis; Oct. '90, pp. 59-64.

M. B. Stephenson et al.; Using Conjoint Meshing Primitives to Generate Quadrilateral and Hexahedral Elements in Irregular Regions; 1989; pp. 163-172.

T. D. Blacker et al.; Automated Quadrilateral Mesh Generation: A Knowledge System Approach; Nov. 27–Dec. 2, 1988; pp. 1-9.

*Primary Examiner*—Edward R. Cosimano

[57] ABSTRACT

An automatic quadrilateral surface discretization method and apparatus is provided for automatically discretizing a geometric region without decomposing the region. The automated quadrilateral surface discretization method and apparatus automatically generates a mesh of all quadrilateral elements which is particularly useful in finite element analysis. The generated mesh of all quadrilateral elements is boundary sensitive, orientation insensitive and has few irregular nodes on the boundary. A permanent boundary of the geometric region is input and rows are iteratively layered toward the interior of the geometric region. Also, an exterior permanent boundary and an interior permanent boundary for a geometric region may be input and the rows are iteratively layered inward from the exterior boundary in a first counter clockwise direction while the rows are iteratively layered from the interior permanent boundary toward the exterior of the region in a second clockwise direction. As a result, a high quality mesh for an arbitrary geometry may be generated with a technique that is robust and fast for complex geometric regions and extreme mesh gradations.

62 Claims, 18 Drawing Sheets

CASE 3:
0 ROW END NODES WITH ROW CORNER OR REVERSAL NODES

CASE 2:
1 ROW END NODE WITH OR WITHOUT ROW CORNER OR REVERSAL NODES

CASE 1:
0 ROW END NODES WITHOUT ROW CORNER OR REVERSAL NODES

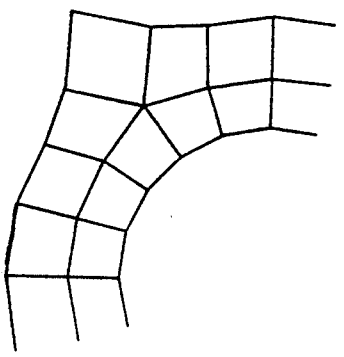
WEDGE INSERTION
FIG. 27(B)
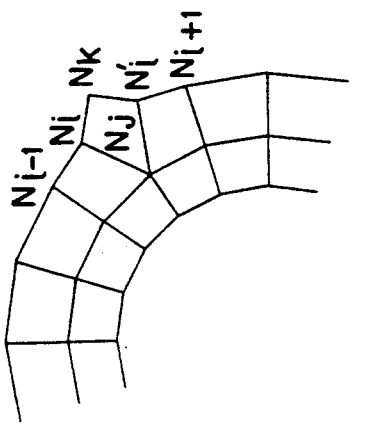
SMOOTHED MESH
FIG. 27(C)
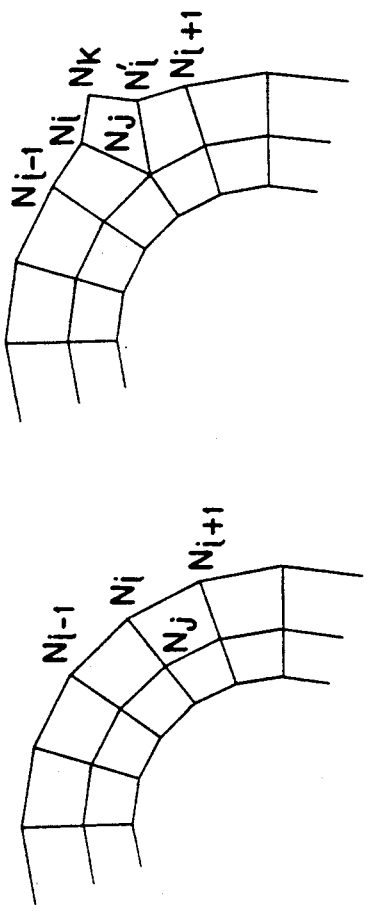
ORIGINAL MESH
FIG. 27(A)
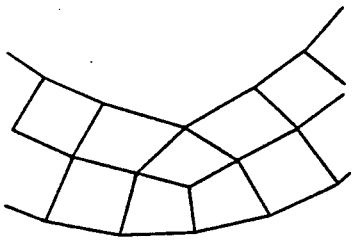
ORIGINAL MESH
FIG. 28(A)
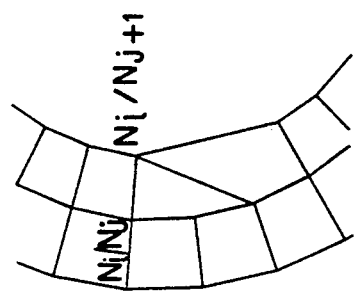
ELEMENT DELETED
FIG. 28(B)
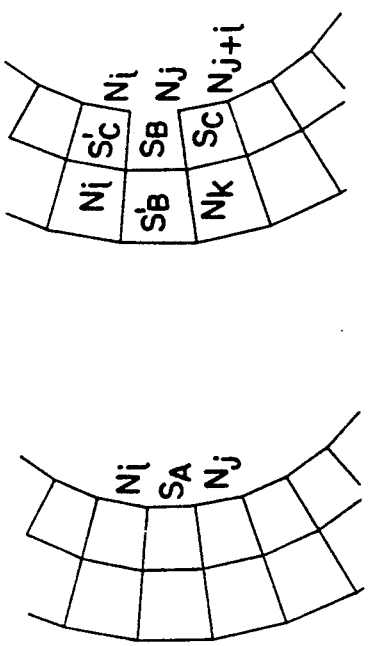
SIDES SUPERIMPOSED
FIG. 28(C)
SMOOTHED MESH
FIG. 28(D)

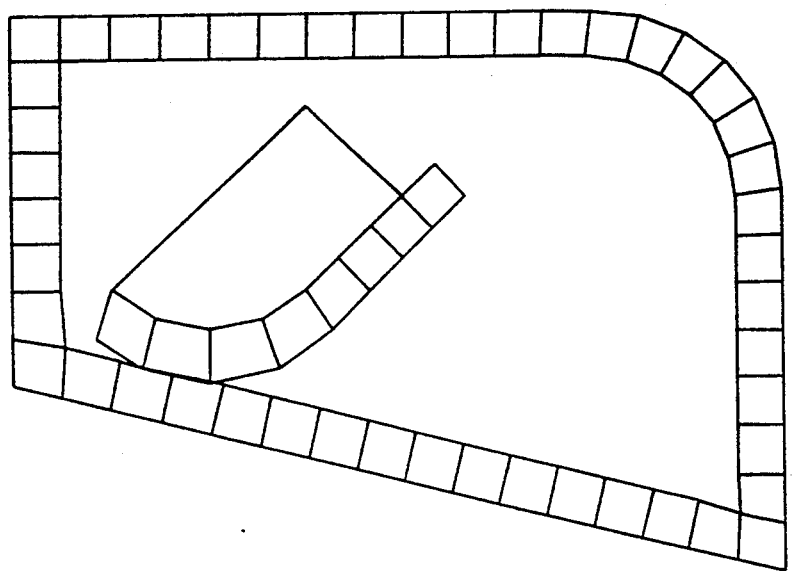
FIG. 29(B) MULTIPLE BOUNDARIES
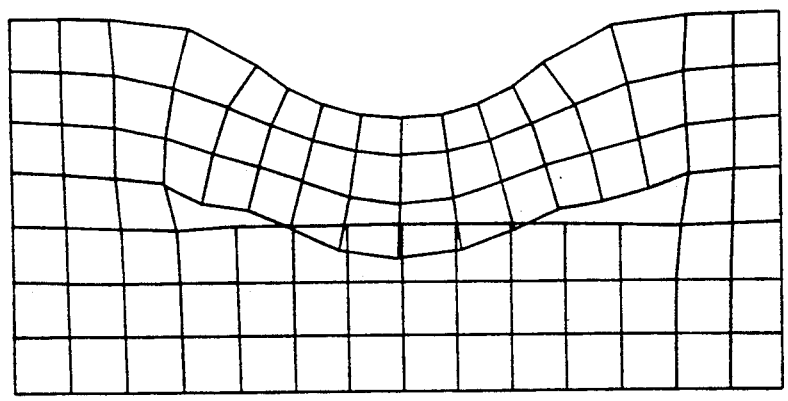
FIG. 29(A) SINGLE BOUNDARY

AUTOMATED QUADRILATERAL SURFACE DISCRETIZATION METHOD AND APPARATUS USABLE TO GENERATE MESH IN A FINITE ELEMENT ANALYSIS SYSTEM

BACKGROUND OF THE INVENTION

The present invention relates to a method and an apparatus for automated quadrilateral surface discretization of a geometric region. More particularly, the present invention is directed to an automated quadrilateral mesh generation method and apparatus using a paving technique which automatically generates a mesh of quadrilateral elements without decomposition of the geometric regions and which is particularly useful in mesh generation for finite element analysis.

DESCRIPTION OF THE RELATED ART

Finite element analysis (FEA) is a powerful numerical method which solves mathematical problems in engineering and physics for determining the physical behavior of an object or a geometric region. Finite element analysis is used in approximating any continuous physical characteristic, such as temperature, pressure, heat or an electric field by a discrete model of a set of piece-wise continuous functions. Typically, finite element analysis is carried out on a computer in a three-step procedure of pre-processing, processing and post-processing. In the pre-processing procedure, geometric boundary data representing the geometric region to be analyzed is taken and a mesh of geometrical elements covering the domain of the geometric region is generated. In the processing step, the element data is taken and mathematical equations are applied to solve for the characteristic of interest across the domain through use of matrix equations. For example, a stimulus is applied to the mesh data and the reaction of the mesh data thereto is analyzed. In the post-processing step, the results of this finite element analysis are output, for example, in a graphical representation of the characteristic of interest.

The pre-processing step of the mesh generation is presently the most time consuming step of finite element analysis. Conventional mesh generation methods may take from hours to days and require the user to pick nodes of the geometric region to form regions in which elements will be generated. In conventional mesh generation methods and systems, the user must decompose or dissect the original geometry into more or less "rectangular" shaped regions for meshing. Depending on the original geometry and the skill of the analyst, the resulting quadrilateral mesh often contains elements that are skewed (internal angles that are much greater or smaller than 90°) or have poor aspect ratios (the length of the longest side of an element being much greater than the shorter side of the element) Elements which are skewed or have poor aspect ratios often introduce serious errors in the analysis. For accurate analyses, the analyst must often iterate, adapting the mesh to more correctly capture the physical phenomenon being modeled.

Finite element analysis is used to model many problems such as heat transfer to fluid flow. However, the majority of finite element analysis is directed to formulating and solving a system of mathematical equations describing linear elastic static and dynamic continuum problems In stress analysis for example, the finite element analysis must accurately describe the displacements or stresses anticipated for a structure under a specific load condition or stimulus FIG. 2 illustrates the conventional finite element analysis steps where the geometric region is input at step 1001 and a mesh is generated for the region at step 1003 during the preprocessing step. Next, a stimulus is applied to the generated mesh at step 1005, the stimulated mesh is analyzed by mathematical equations (analysis is performed on the finite elements) at step 1007 and analysis data is produced at step 1009 during the processing procedures of the finite element analysis. Finally, the analysis data is displayed or used to determine the physical behavior of the geometric region at step 1011 during the post processing procedures. This use could be by displaying the data for the operator or in any automated process such as use to redesign a geometric region representative of a machine element through use of computer controlled optimization techniques.

Finite element analysis is the most common environment for using mesh generation. However, the mesh generation used in finite element analysis may be used in any method or apparatus requiring automatic surface discretization of a geometric region. For example, the surface discretization methods and apparatus may be used in computer graphics for calculating shading, reflections, etc. of a geometric region.

Because conventional mesh generation techniques are tedious and error prone, automation of the mesh generation task is highly desirable. Presently, automation of the mesh generation is focused on 2-D QUADTREE and 3-D OCTREE, triangulation or sub-structuring techniques. Each of these techniques generate meshes using triangular elements that are less accurate and less versatile than quadrilateral elements.

The conventional non-automated mesh generation techniques presently used produce their all quadrilateral meshes by employing parameter space mapping. The parameter space mapping is not automatic because the user must decompose the geometry of the object into regions that map well into parametric space. Even though the parameter space mapping is laborious and user intensive, many skilled users prefer this parameter space mapping technique over the existing automated mesh generation systems because this technique exhibits boundary sensitivity, orientation insensitivity and produces few irregular nodes.

Boundary sensitivity provides mesh contours that closely follow the contours of the boundary of the object and is important because well-shaped elements are desired near the boundary of the object. Orientation insensitivity prevents the resulting mesh topology from changing when the geometry of an object is rotated or translated. In other words, the generated mesh in a transformed geometry is equivalent to the original mesh before being transformed.

An interior mesh node is considered to be irregular unless four elements are connected to the node. The number of elements sharing a node is a critical mesh topology feature which controls the final shape of the elements. Thereby, a mesh with few irregular nodes is desired with an emphasis on preventing irregular nodes near the boundary of the object where the element shape is critical.

In an attempt to obtain the positive characteristics of parameter space mapping while eliminating the high amount of labor and expertise associated with generating an all quadrilateral element mesh, an automated quadrilateral meshing technique using an automated meshing knowledge system (AMEKS) was implemented to decompose a geometry of the object into primative geometric regions for mapping in a similar manner as performed by an experienced user. However, the automated quadrilateral meshing technique using AMEKS suffered from a lack of robustness, long analysis run times and incompatibility with software and hardware in most engineering environments.

OBJECTS OF THE INVENTION

An object of the present invention is to provide an object and apparatus for automating quadrilateral surface discretization of a geometric region which is boundary sensitive so that the quadrilateral surface discretization closely follows the contours of the boundary of the geometric region.

Another object of the present invention is to provide a method and an apparatus for automating quadrilateral surface discretization of a geometric region which is orientation insensitive so that a rotation or a translation of the geometric region does not change the topology of the resulting surface discretization.

A further object of the present invention is to provide a method and apparatus for automating surface discretization of a geometric region which has few irregular nodes near the boundary of the geometric region.

A further object of the present invention is to develop a quadrilateral surface mesh without the requirement of decomposition of the geometric region into primative geometric regions requiring complex user or computer determinations.

A still further object of the present invention is to utilize the automated quadrilateral surface discretization technique of the present invention in a more fully automated quadrilateral mesh finite element analysis system.

SUMMARY OF THE INVENTION

The present invention provides methods and apparatus for automatically generating a mesh of all quadrilateral elements without decomposition of the geometric region while providing boundary sensitivity, orientation insensitivity and few irregular nodes. The mesh of quadrilateral elements is automatically generated by iteratively layering the geometric region with rows of quadrilateral elements from the exterior boundary of the geometric region toward the interior.

The objects of the present invention are fulfilled by providing a method and an apparatus for automatically generating a mesh of all quadrilateral elements for finite element analysis of a geometric region comprising the steps of inputting a permanent boundary of the geometric region and iteratively layering rows of quadrilateral elements progressing inward from the permanent boundary. Further steps includes the inputting an exterior permanent boundary of the geometric region, inputting at least one interior permanent boundary of the object, iteratively layering quadrilateral elements in a first direction toward the interior of the geometric region and iteratively layering quadrilateral elements in a second direction toward the exterior of the geometric region.

The paving operations which are iteratively performed to generate the mesh of all quadrilateral elements comprise closure checking to determine whether one external or interior paving boundary row contains six or less fixed and external nodes of the one external or interior paving boundary, determining the location of a subsequent external or interior boundary row to the one external or interior paving boundary row by classifying the fixed and floating nodes, smoothing the external and interior paving boundary rows to maintain a desired size and shape of the quadrilateral elements of the mesh, scanning the external and interior paving boundary rows to close cracks between adjacent external paving boundary rows, respectively, and adjusting the external and interior paving boundary rows to prevent expansion and contraction of the quadrilateral elements of the mesh.

The apparatus and method of the present invention provides automated quadrilateral surface discretization of a geometric region which is boundary sensitive, orientation insensitive and has few irregular nodes near the boundaries. By iteratively layering the boundaries of the geometric region with a series of interdependent steps, well formed quadrilateral elements are positioned along the boundary of the geometric region while irregular nodes are positioned in the interior of the geometric region. The automated quadrilateral surface discretization method and apparatus is robust and operates at high speeds for complex geometric regions and extreme surface discretization gradations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 27)A)-27(C) illustrate inserting a wedge according to the present invention;

FIGS. 28(A)-28(D) illustrate forming a tuck in the present invention; and

FIGS. 29(A) and 29(B) illustrate single boundary and multiple boundaries of paving boundaries.

DESCRIPTION OF THE PREFERRED EMBODIMENTS

The present invention is directed to a method and an apparatus for automatically generating a mesh of all quadrilateral elements for a geometric region of an arbitrary geometry in a finite element analysis (FEA). A paving technique is used for automatically generating the mesh of all quadrilateral elements without decomposition of the geometric region.

Figure 1:
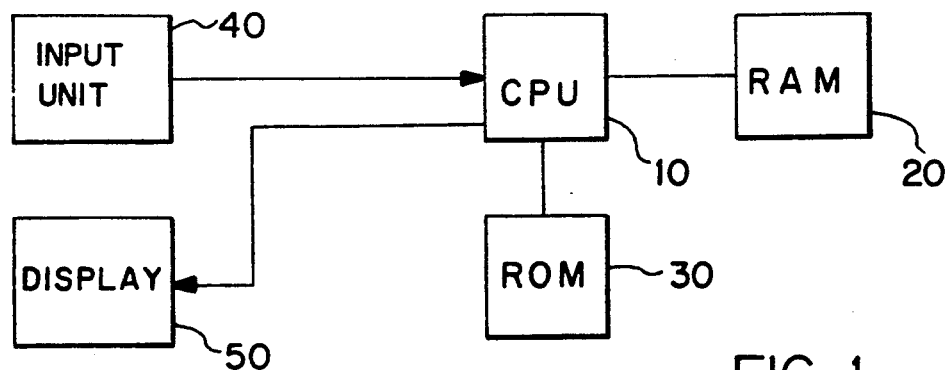
FIG. 1 illustrates the apparatus used in the preferred embodiment of the present invention.
Figure 2:
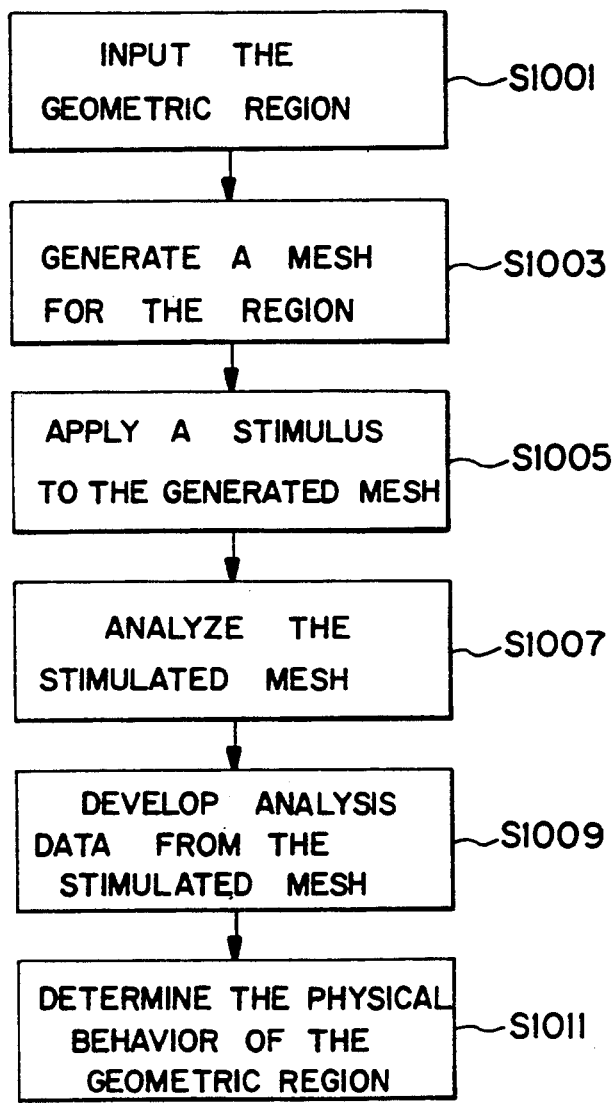
FIG. 2 illustrates a flow diagram for finite element analysis.

In a preferred embodiment of the present invention, the apparatus and method of the paving technique may be adapted to run on a work station programmed with a conventional quadrilateral mesh generation program such as FASTQ in a preferred embodiment. FASTQ is a preprocessor, developed at Sandia National Laboratories. Any other commercial CAD/CAM mesh generation package including PATRAN and SUPER-TAB could use this technique in their program. FIG. 1 illustrates a CPU 10 connected to a RAM 20 and a ROM 30 for running the quadrilateral mesh generation program with the paving technique (the pseudo code of the program is shown in the pseudo code appendix, which is located in the patented file). An input unit 40 is connected to the CPU 10 for inputting geometric data into a data base stored in the RAM 20. The input unit 40 may be a conventional CAD/CAM input such as a VAX 11/780 in a preferred embodiment for entering geometric data of the object into the data base by drawing the geometric region on the screen of the CAD/CAM system or directly entering the data via a keyboard, mouse, digitizer or the like for the geometric region into a data file. The data input for the geometric region may include any physical characteristic data for the geometric region such as geometric data, thermal conductivity, material strength, etc. In addition, a display 50 is connected to the CPU 10 for displaying the geometric data. A conventional display, such as a CRT for example, may be used as the display 50.

The finite element analysis uses the generated quadrilateral mesh representation of the geometric region as illustrated in FIGS. 12(A)-12(D).

Figure 3:
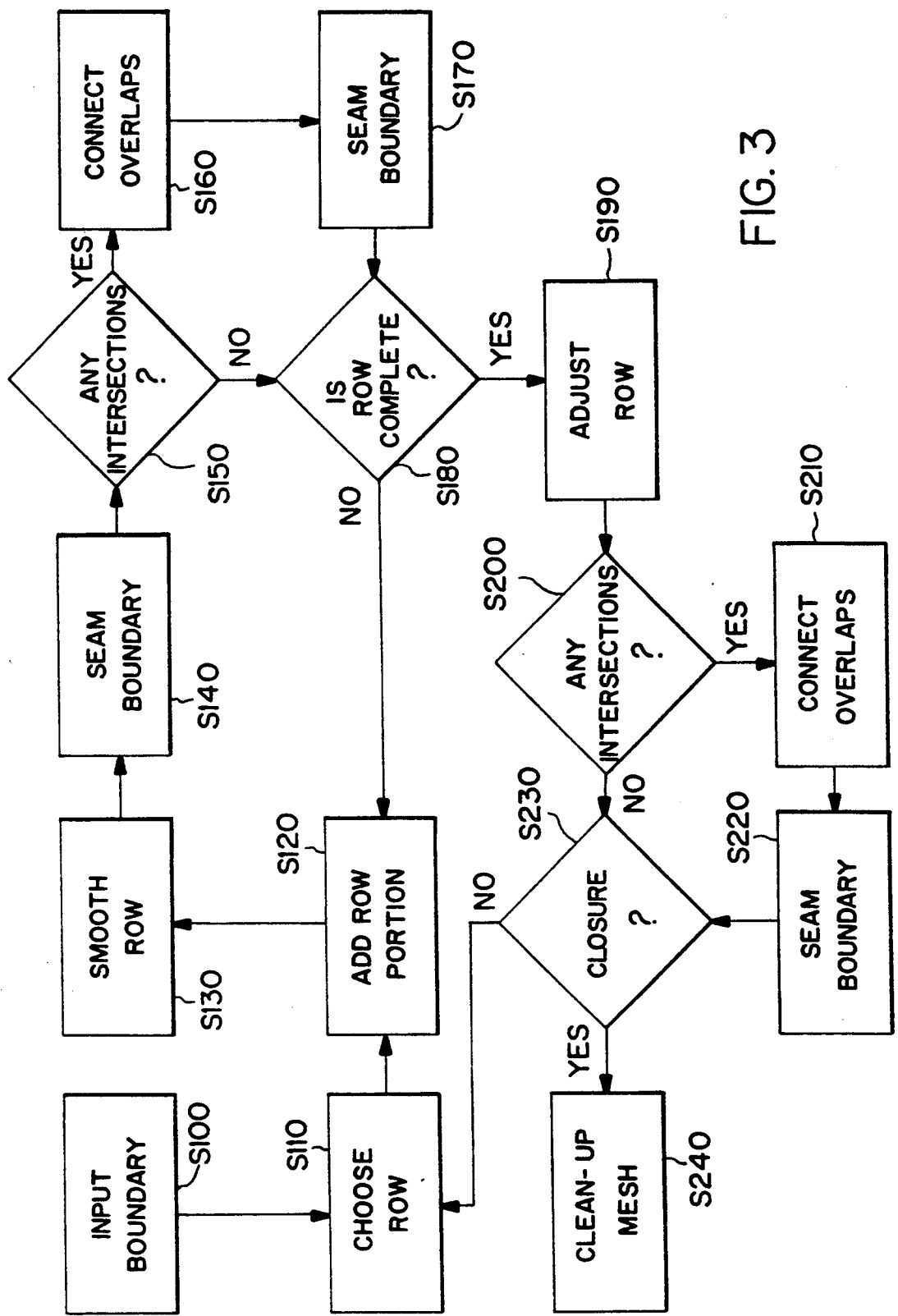
FIG. 3 illustrates a flow chart for the paving technique for the preferred embodiment of the present invention.
Figure 12D:
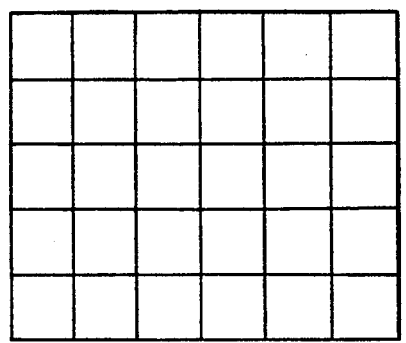
FIGS. 12(A)-12(D) illustrate iteratively forming rows according to the present invention.
Figure 12C:
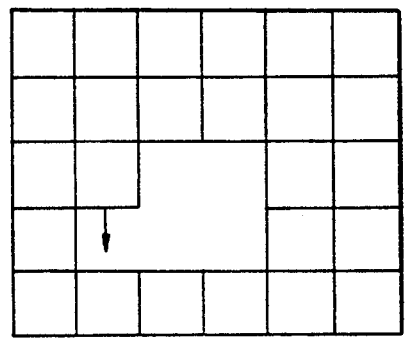
Figure 12B:
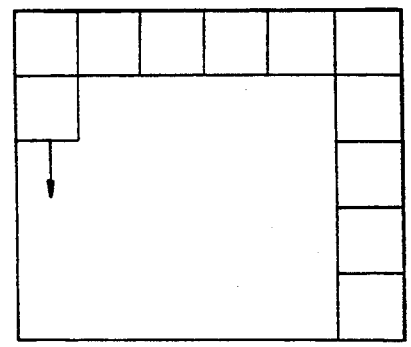
Figure 12A:
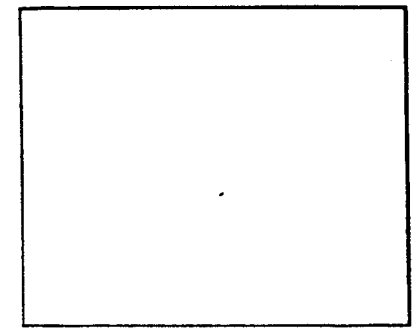
Figure 13A:
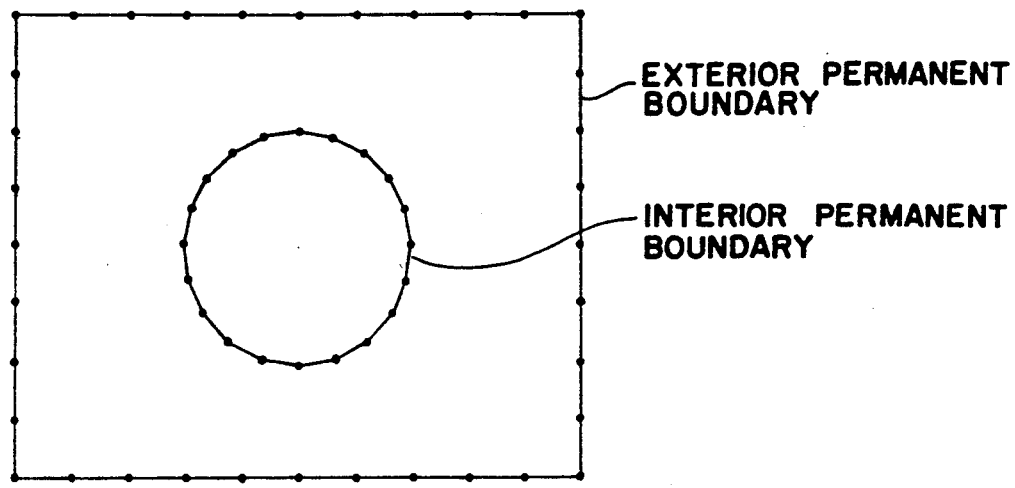
FIGS. 13(A) and 13(B) illustrate iteratively paving interior and exterior paving boundaries for the present invention.
Figure 13B:
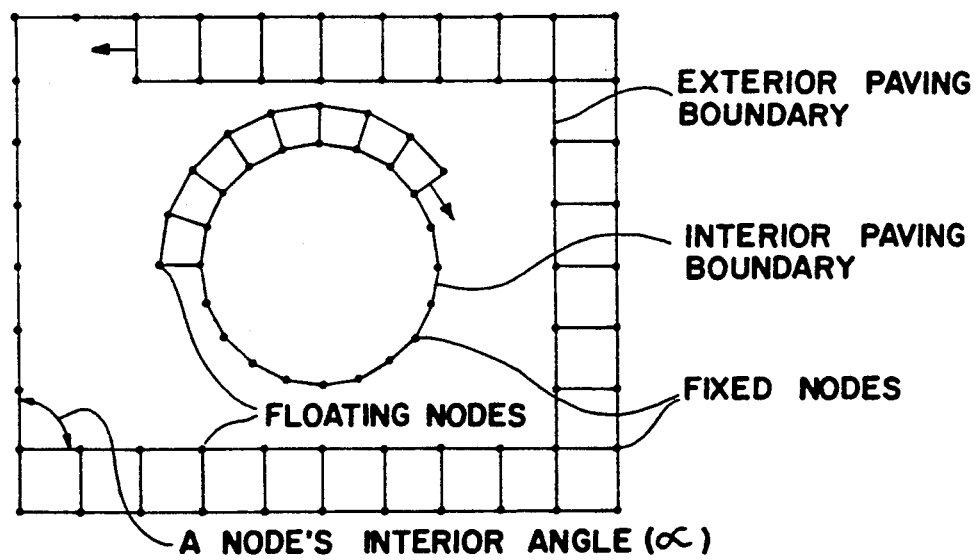

After inputting the data for the geometric region into the data base, an all quadrilateral mesh is automatically generated by the paving technique of the present invention without decomposing the geometric region. The paving technique is accomplished by iteratively paving the geometric region with rows of quadrilateral elements from the exterior boundaries toward the interior of the geometric region. The paving technique includes an interdependent series of steps as illustrated in FIG. 3. FIGS. 12(A)-12(D) illustrate iteratively paving rows of quadrilateral elements toward the interior of the geometric region until the region is eventually filled with the quadrilateral elements The interdependent series of steps in the paving technique includes choosing a row, closure checking, row generation, smoothing, seaming, row adjusting, intersecting and cleaning up which will be described below in more detail As illustrated in FIG. 3, the paving technique begins by inputting a boundary at step 100 of one or more ordered and closed loops of connected nodes. FIG. 12(A) illustrates the initial loops as the permanent boundary of the region. The connectivity and location of nodes on the permanent boundaries are not allowed to change during paving so that mesh compatibility is ensured with adjacent regions The permanent boundaries of the regions are either exterior or interior boundaries. Only one exterior permanent boundary exists for a region that must be a loop of nodes that is nonintersecting and completely encloses the region to be meshed. The exterior permanent boundary is ordered counterclockwise as illustrated in FIG. 13(B). Interior permanent boundaries define voids or holes in the region to be meshed and are ordered clockwise as illustrated in FIGS. 13(A) and 13(B). The interior permanent boundaries must be completely enclosed within the exterior permanent boundary and no permanent boundary may intersect any other permanent boundary. There may be any number of interior boundaries including none.

The paving technique always operates on boundaries of connected nodes referred to as paving boundaries during the mesh generation process. The paving boundaries are transient in nature and therefore may change as the mesh is generated. The paving boundaries are illustrated by the bold lines in FIG. 13(B) and always bound the existing mesh. Each paving boundary is initially identical to a permanent boundary until added elements to the mesh eventually separate the paving boundary from the corresponding permanent boundary. The paving boundaries are categorized as either exterior or interior paving boundaries. Exterior paving boundaries are paved counterclockwise from the exterior to interior of the region. Interior paving boundaries are paved clockwise outward from the interior of the region.

The nodes in the mesh include paving nodes which may be floating nodes or fixed nodes as illustrated in FIG. 13(B). Paving nodes are any nodes on a paving boundary with a fixed node being any node on a permanent boundary and a floating node being any node not on a permanent boundary. As a result, a paving boundary may include fixed nodes, floating nodes or combinations of fixed and floating nodes. Also, the paving boundary nodes have interior angles which are the angles between a line connecting the node to the preceding node and a line connecting the node to the next node in the paving boundary as illustrated by the interior angle $\alpha$ in FIG. 13(B). Each paving boundary must contain an even number of nodes so that an all quadrilateral mesh can be generated. This condition is enforced by controlling the operations during the paving process.

The size of the quadrilateral elements in the mesh is determined by the spacing of nodes on the paving boundary as the paving boundary propagates. The spacing on the paving boundary is initially defined by the fixed node spacings on the corresponding exterior boundary and an attempt is made to maintain this spacing as the paving technique progresses. As a result, an operator may control the element size by modifying the spacing of the initial nodes on a permanent boundary. This spacing does not need to be uniform and is usually not uniform because it is often desirable to mesh a region with a gradation of quadrilateral element sizes, for example decreasing node spacing in an area of interest.

Figure 4:
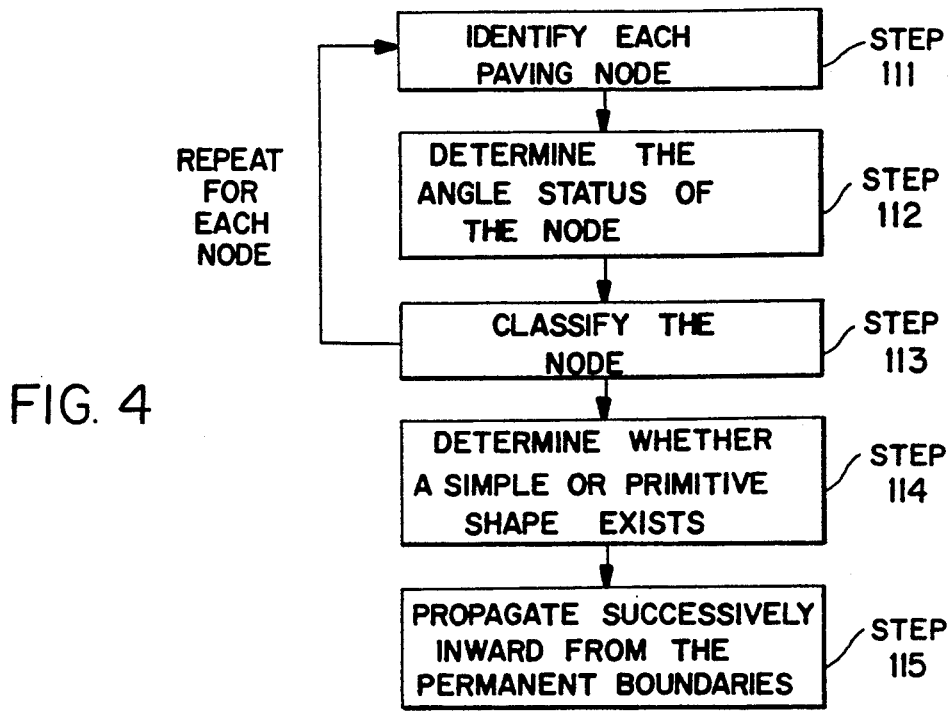
FIG. 4 illustrates a flow chart for choosing the next row in the paving technique for the present invention.
Figure 14:
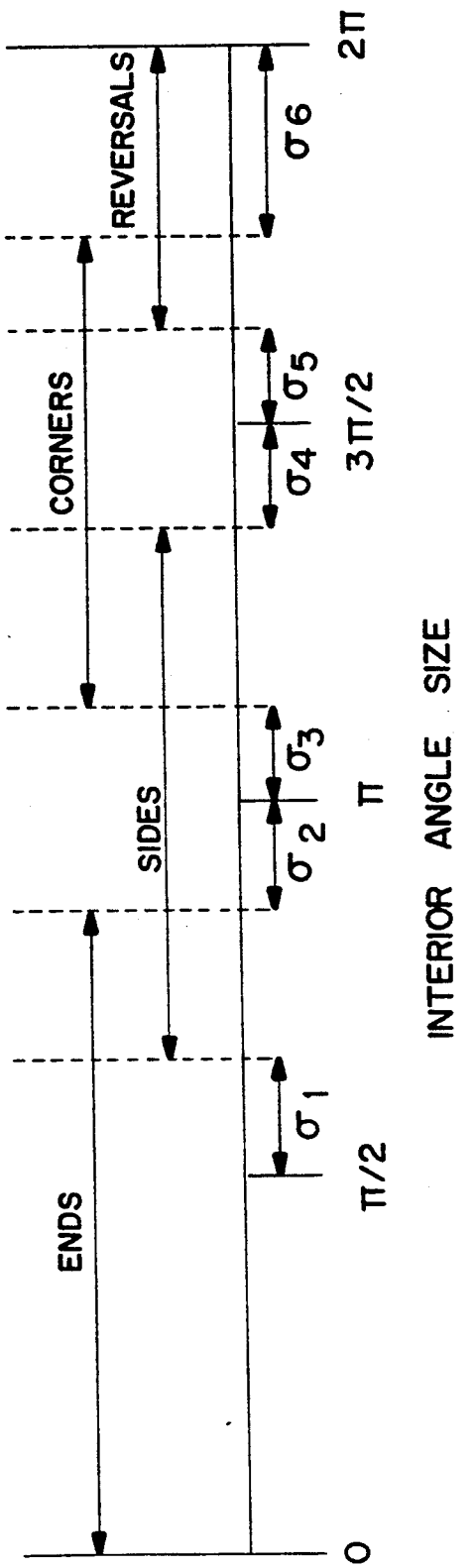
FIG. 14 illustrates angle status categories used for choosing a new row in the present invention.
Figure 15:
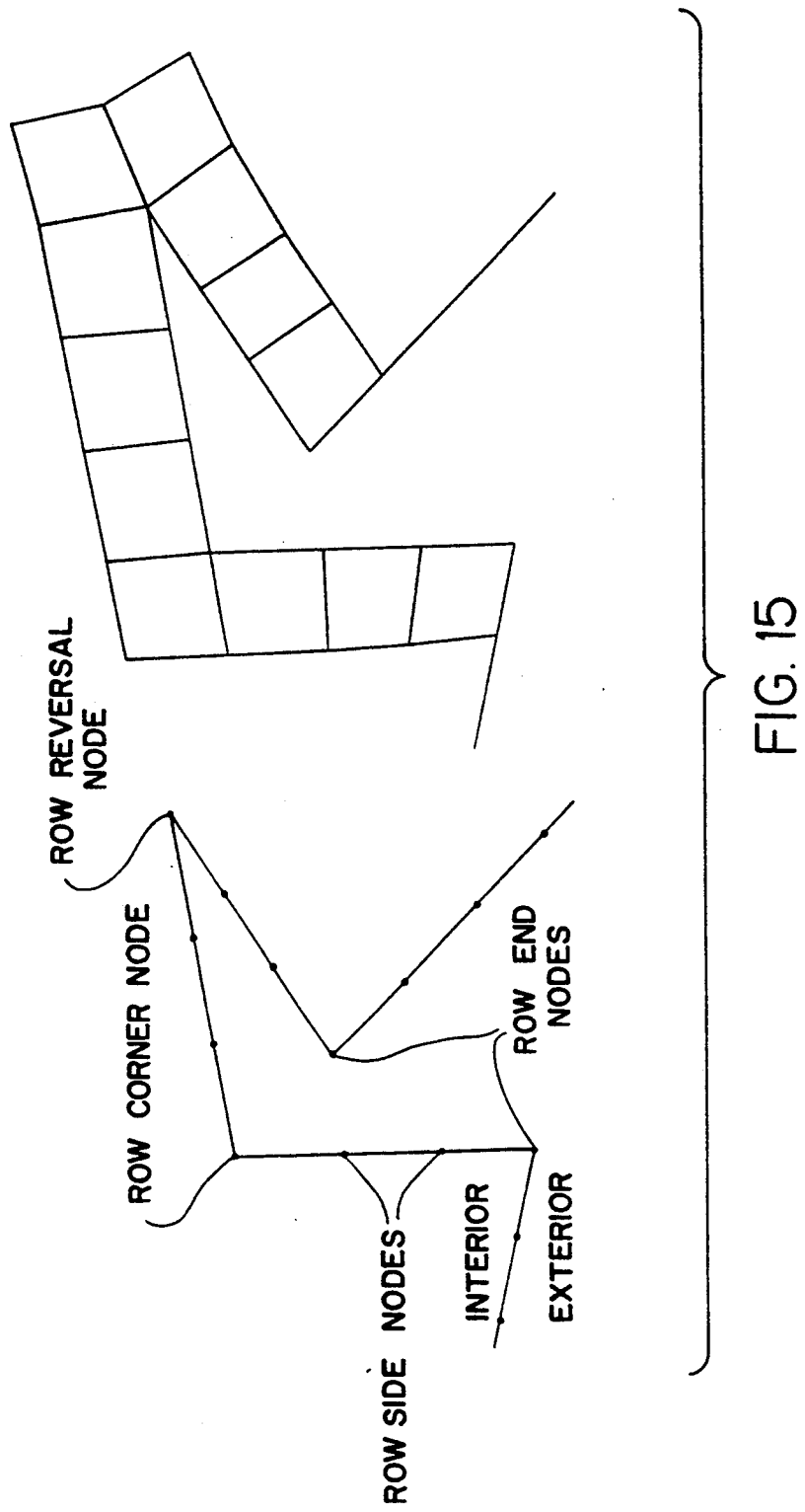
FIG. 15 illustrates the angle status categories of FIG. 14.

After the initial boundary is input at step 100, the location of the next row of quadrilateral elements is determined by choosing the next row at step 110. A row is defined by appropriate beginning and ending paving nodes which involves classifying the paving nodes on the paving boundary and determining whether the paving boundaries form simple shapes such as a rectangle or other primitive region before inserting new rows. The steps for choosing the next row is illustrated in FIG. 4 and pages 8-10 of the pseudo code appendix, which is located in the patented file. At step 111, each paving node is identified. Each paving node on a current paving boundary is determined to have an angle status based on the interior angle $\alpha$ of the node and the setting of angle tolerances $\sigma_1$, $\sigma_2$, $\sigma_3$, $\sigma_4$, $\sigma_5$ and $\sigma_6$ which represent an allowable deviation from an expected angular value at step 112. The angle status categories for the paving nodes are: row end; ambiguous row end/side; row side; ambiguous row side/corner; row corner; ambiguous row corner/reversal; and row reversal. A summary of the angle status categories are illustrated in FIG. 14. The row end category is defined by:

$$\alpha \leq \pi/2 + \sigma_1,\qquad [1]$$

and specifies a node at which a row terminates. Only one new element will be inserted at a row end node as illustrated in FIG. 15.

The ambiguous row end/side category is defined by:

$$\pi/2 + \sigma_1 < \alpha \leq \pi - \sigma_2,\qquad [2]$$

and specifies a node which may function as either a row end or a row side.

The row side category is defined by:

$$\pi - \sigma_2 < \alpha \leq \pi + \sigma_3,\qquad [3]$$

and specifies a node along which the row continues normally and two new elements are attached to each row side node as illustrated in FIG. 15.

The ambiguous row side/corner category is defined by:

$$\pi + \sigma_3 < \alpha \leq 3\pi/2 - \sigma_4,\qquad [4]$$

and specifies either a row side node or a row corner node.

The row corner category is defined by:

$$3\pi/2 - \sigma_4 < \alpha \leq 3\pi/2 + \sigma_5,\qquad [5]$$

and specifies a node at which the row turns a logical corner and three new elements are attached to each row corner as illustrated in FIG. 15.

The ambiguous row corner/reversal category is defined by:

$$3\pi/2 + \sigma_5 < \alpha \leq 2\pi - \sigma_6,\qquad [6]$$

and specifies either a row corner or a row reversal.

The row reversal category is defined by:

$$\alpha > 2\pi - \sigma_6,\qquad [7]$$

and specifies a node at which the row turns two sequential logical corners or reverses its directions. For new elements are attached to each row reversal node as illustrated in FIG. 15. In the preferred embodiment $\sigma_1$-$\sigma_6$ are predetermined by the user as the allowable deviation from the expected angular value. Each node is eventually classified as either a row end, side, corner or reversal node and the ambiguous angle status categories are resolved by looking for simple shapes and primitive regions or by avoiding irregular node generation at step 113 as will be further described.

Figure 16C:
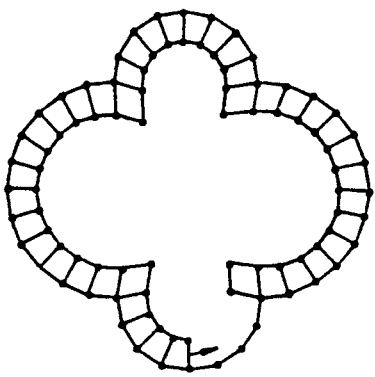
FIGS. 16(A)-16(C) illustrate three special cases of paving boundaries for the present invention.
Figure 16B:
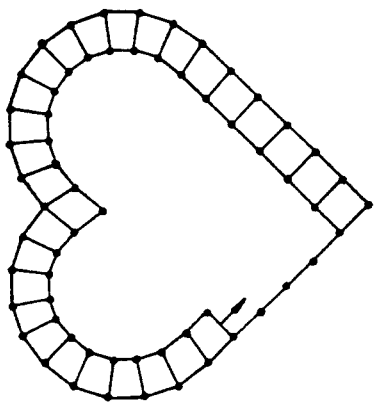
Figure 16A:
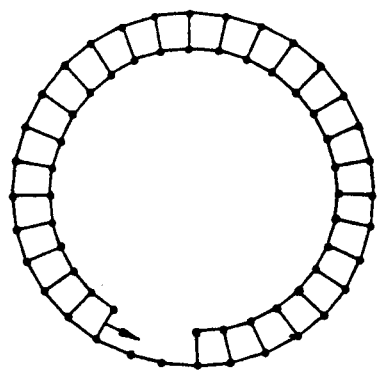

Most paving boundaries contain two row end nodes where the next row can start and end. However, three special cases of paving boundaries exist that do not contain two row end nodes as illustrated in FIGS. 16(A)-16(C) and these three cases must have a row added differently. FIG. 16(A) illustrates a first case of a circle where the paving boundary has only row side nodes and the node with the smallest angle is chosen as both the beginning and ending node in the new row to be generated. FIG. 16(B) illustrates a second case of a heart shape having only one row end node and any number of row side, corner or reversal nodes. Here, the row end node becomes both the start and finish node for the new row. FIG. 16(C) illustrates a third case of a club shape where the paving boundary has no row end nodes but some row corner and/or row reversal nodes. Here, the row corner or row reversal node with the smallest interior angle is chosen as the row start and finish node.

After repeating steps 111, 112 and 113 for each node, the formation of simple shapes or primitive regions is considered next after the node classification, for determining the next row to be paved at step 114. Determination of primitive regions are only considered when dealing with exterior paving boundaries. If primitive regions are identified, the placement of new rows can be adjusted for completing the paving of the primitive region with a minimum number of irregular nodes. Examples of primitive regions used in the paving technique are a rectangle, a triangle and a semicircle. A primitive region by definition does not contain any row corner or reversal nodes and boundaries that contain row corner or reversal nodes are therefore not identified as primitive regions. For example, the primitive regions that are used by the paving technique in the preferred embodiment are the rectangle, triangle and semicircle. The determination of whether a primitive region exists begins by searching all possible row end and row side node interpretations. All nodes which have been categorized as ambiguous row end/side nodes are evaluated as being either a corner or a side node for each of the possible interpretations. To preserve the possibility of a primitive region existing, any ambiguous row side/corner node is always interpreted as a side node. Although it is possible for a region to have a large amount of interpretations, the maximum number of interpretations is approximately 10 and the average number of interpretations is one or two.

Each boundary interpretation combination is evaluated for quality and validity as a primitive region. The quality if based on the formation of the regular nodes along the existing boundary, the deviation of the angles from perfect end or side nodes and the number of irregular nodes to be expected within the interior of the resulting primitive region as it is meshed. The validity depends on the requirements of each primitive region as disclosed in "Using Conjoint Meshing Primitives to Generate Quadrilateral and Hexahedral Elements in Irregular Regions," *ASME*, July 1989, Stevenson et al.

When an acceptable primitive evaluation exists, the evaluation is used to determine the placement of the next row at step 120 in FIG. 3. Node classifications are set to the classifications used in the primitive interpretation and the row end nodes for the next row are chosen so that the primitive region is not invalidated and the sequential ordering is maintained. The primitive evaluation is only a limited global view of the boundary because the evaluation does not contain information as to the overall shape, the position and the orientation of the various boundaries with respect to each other, the proximity of possible overlaps, etc. Boundary shapes are often misinterpreted because of the limitations in this simple evaluation but the evaluation is repeated as each row is added so that the evaluations are self-correcting.

When it is determined that an acceptable primitive region does not exist, all ambiguous nodes are classified based on the angle size and the possibility of generating an irregular node. For example, if an ambiguous side/corner node is classified as a side node forming an irregular node while a corner classification would not form an irregular node, the corner classification is allowed a greater angle tolerance.

The final concern in choosing a row is propagating the paving boundary successively inward away from all of the permanent boundaries at step 115. This is accomplished by adding new rows at step 120 that are sequential to (i.e., topologically next to) the last row installed in the paving boundary. Rows are initially installed around the exterior paving boundaries sequentially counterclockwise so that after each complete traversal of the exterior paving boundary, each interior paving boundary is paved with one complete traversal sequentially clockwise. Although rows may not form true rings inside the boundary, the sequential ordering of row placement generally forces boundaries to close toward the interior of the region so that irregular nodes are placed on the interior of the geometry and away from the more critical boundary elements, which is a highly desirable aspect of the present invention.

Figure 5:
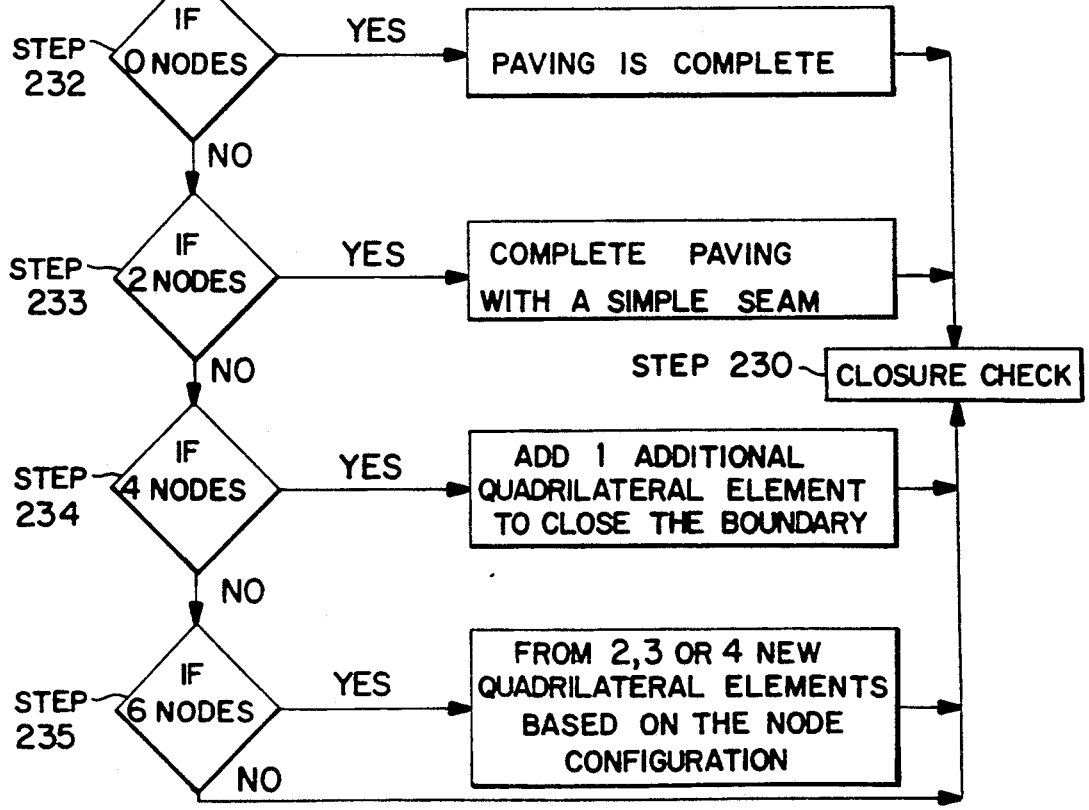
FIG. 5 illustrates a flow chart for closure checking of the paving technique or the present invention.
Figure 17:
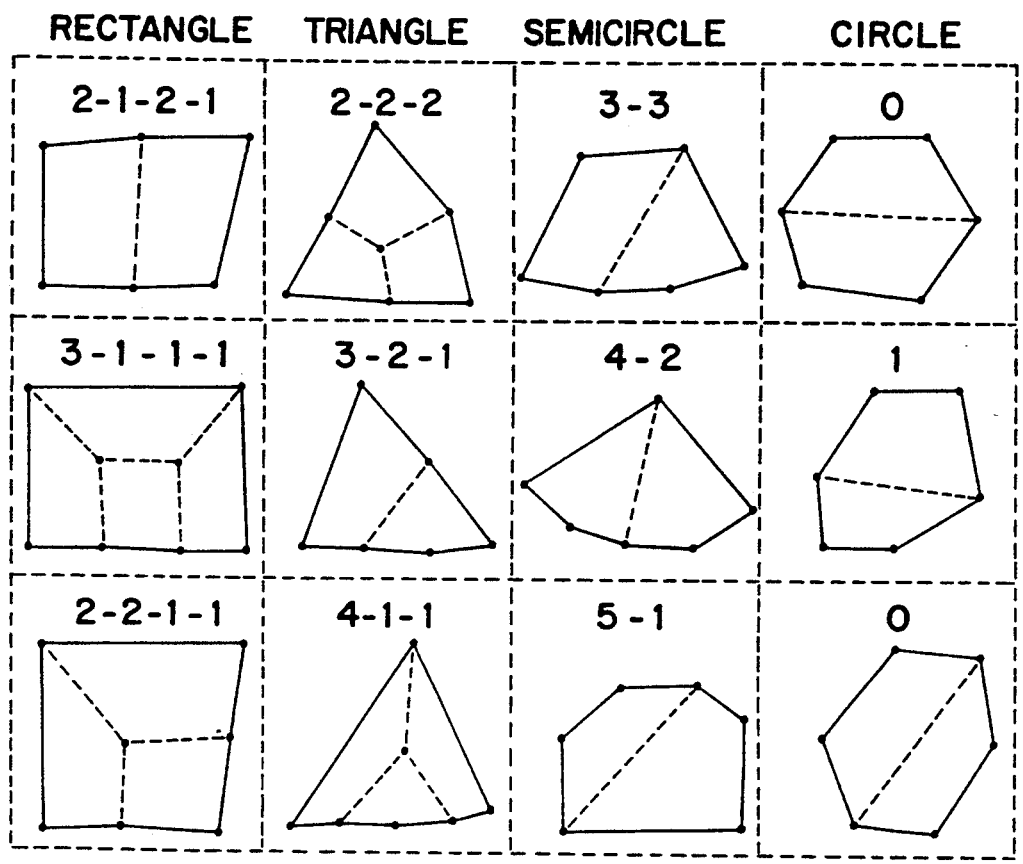
FIG. 17 illustrates closing configurations when six nodes remain during the closure check of the present invention.

A closure check is made at step 230. The closure check determines whether the paving boundary contains six or less nodes before any new rows of quadrilateral elements are added to the mesh at step 231 as illustrated in FIG. 5 and pages 11-13 of the pseudo code appendix, which is located in the patented file. If the boundary contains zero nodes at step 232, paving of the boundary is completed. If the boundary contains two nodes at step 233, paving can be completed with a simple seam as will be explained below. If the boundary contains four nodes at step 234, one additional quadrilateral element is added to close the boundary. Closure for boundaries containing six nodes is based on the configuration of the six nodes at step 235 and may form to close two, three or four new elements as illustrated in FIG. 17. The numbers above each closure indicates how many element edges are in each side of the shape. Even though some of the elements illustrated in FIG. 17 are poor quadrilateral elements, subsequent smoothing and clean-up steps to be described below will improve or eliminate the problem elements. If the closure steps are performed after either of steps 232, 233, 234 or 235, a clean up procedure is performed at step 240, which will be discussed latter. However, if the closure check is determined to be "NO" at step 230 and none of the closure steps are performed, a next row is chosen at step 110, as previously discussed.

Figure 6:
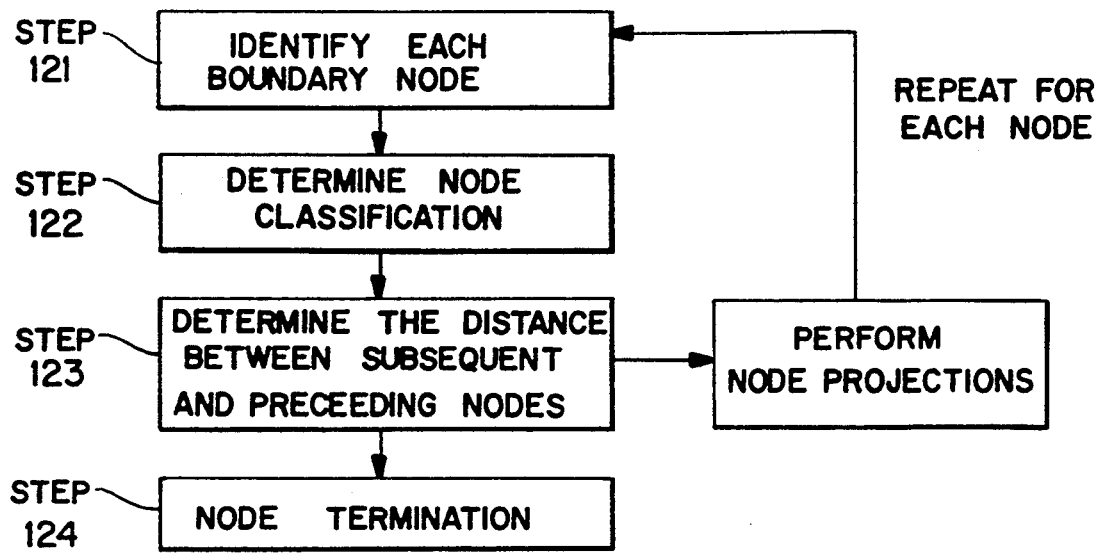
FIG. 6 illustrates a flow chart for row generation in the paving technique for the present invention.
Figure 18:
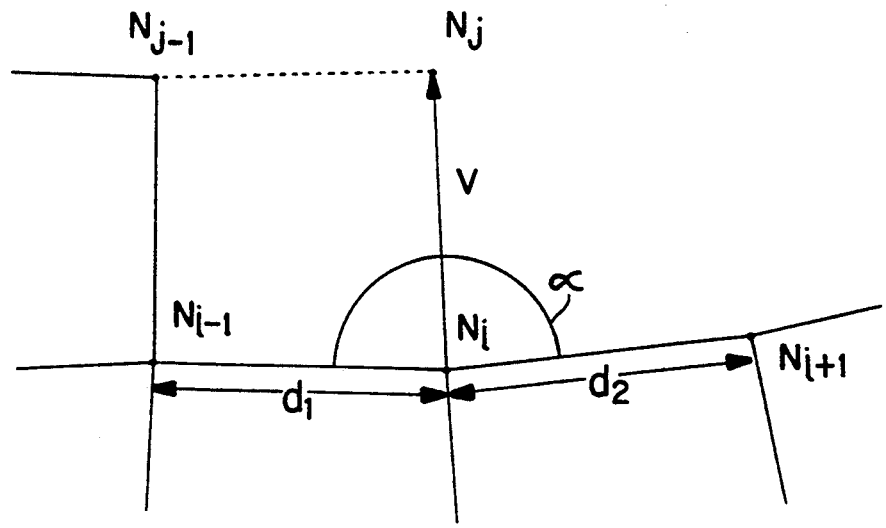
FIG. 18 illustrates projecting from a side row node during row generation in the present invention.

After choosing the limits of the new row, the new row may be added at step 120 by projecting new nodes away from each sequential boundary node at an appropriate angle and distance. At step 121, each boundary node is identified. The projection of the new nodes is based on the node classification at step 122 and the distance between immediately preceding and subsequent boundary nodes at step 123 as illustrated in FIG. 6 and pages 14-17 of the pseudo code appendix, which is located in the patented file. Elements and nodes are generated sequentially along the row. Elements and nodes are projected from row side, corner and reversal nodes. Step 121-123 and node projections are repeated for each node and the addition of the new row is completed at step 124 after each boundary node is processed. Row end nodes form the basis for either beginning or ending a row, and as such, are not projected. The projection from a side row node is illustrated in FIG. 18 where the existing side node is $N_i$ and the new node $N_j$ is placed at the tip of a vector V having the origin $N_i$. The vector V is oriented to bisect the interior angle $\alpha$ at $N_i$. A distance d is the distance from the node $N_i$ to the node $N_{i-1}$ and $d_2$ is the distance from the node $N_i$ to the node $N_{i+1}$. As a result, the length of the vector V is given by the equation:

$$|V| = \frac{(d_1 + d_2)/2}{\sin(\alpha/2)} \qquad [8]$$

Figure 19:
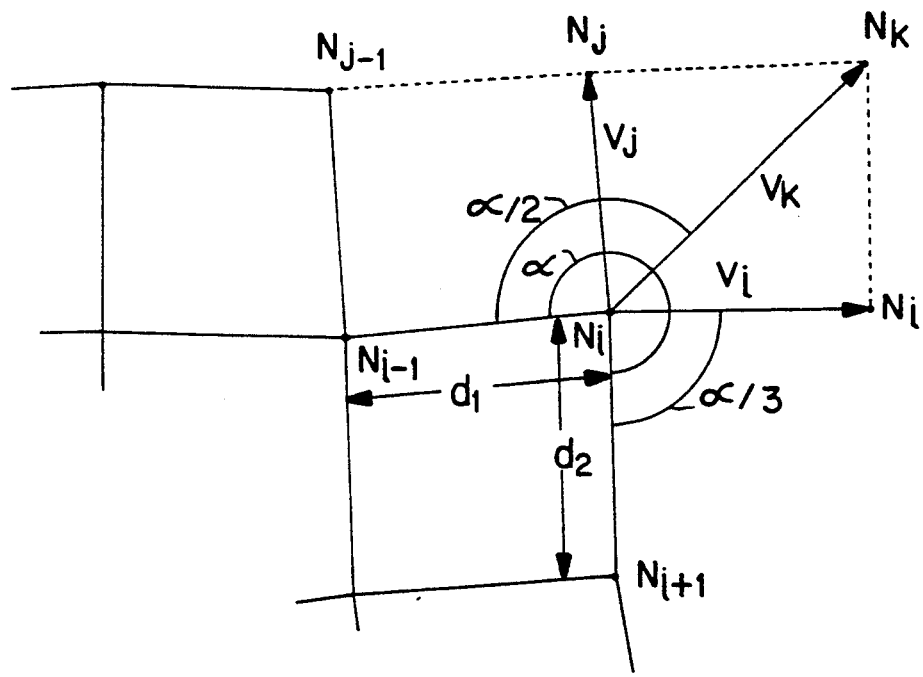
FIG. 19 illustrates the projection from a row corner node during row generation in the present invention.

The sine term in the equation tends to smooth out otherwise bumpy rows. The projection from the row side node N usually transforms the new node into a row end node, thus effectively moving the row end forward one step. The projection from a row corner node is illustrated in FIG. 19 where the existing corner node $N_i$ has three new nodes $N_j$, $N_k$ and $N_l$ formed from vectors $V_j$, $V_k$, and $V_l$ are oriented at clockwise ¼, ½ and ¾ bisections, respectively, of the interior angle $\alpha$ of the node $N_i$. The magnitudes of the vectors are given by the equations:

$$|V_j| = \frac{(d_1 + d_2)/2}{\sin(\alpha/3)} \quad [9]$$

$$|V_k| = \sqrt{2}\ |V_j| \quad [10]$$

$$|V_l| = |V_j| \quad [11]$$

Figure 10:
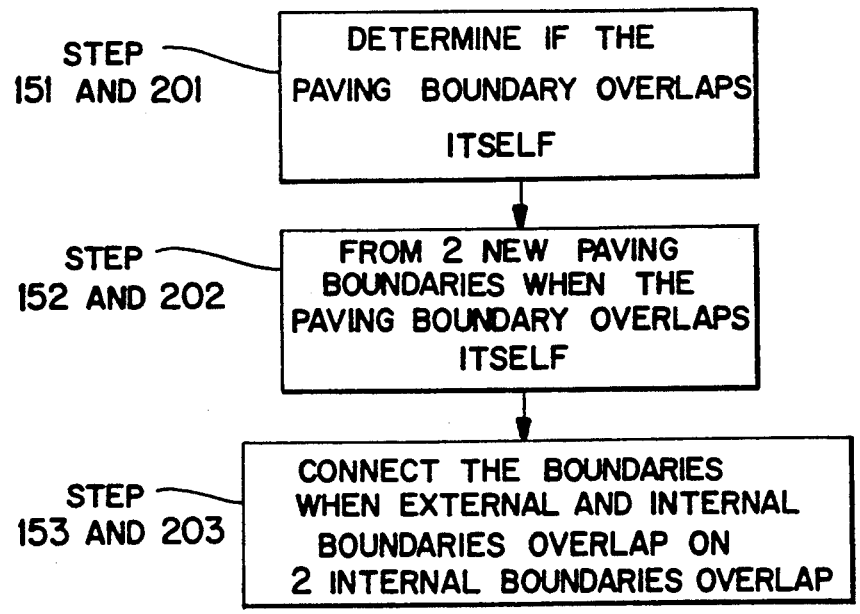
FIG. 10 illustrates a flow chart for intersection detecting in the paving technique for the present invention.

The distances $d_1$ and $d_2$ are as defined above. Two new quadrilateral elements are added to the mesh and are defined by the nodes $N_i$, $N_{i-1}$, $N_{j-1}$ and $N_j$ and the nodes $N_i$, $N_j$, $N_k$ and $N_l$ as illustrated in FIG. 19. As illustrated in FIG. 10, the projection from the row corner node $N_i$ propagates the row end around the corner and introduces another new row corner node $N_k$ into the paving boundary.

Figure 20:
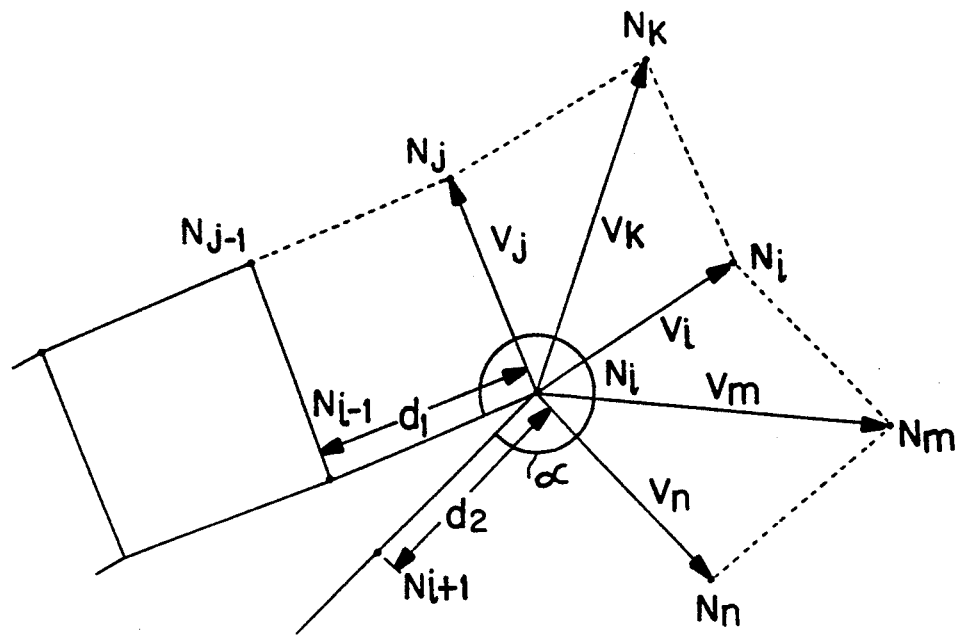
FIG. 20 illustrates the projection from a row reversal node during row generation according to the present invention.

The projection from a row reversal node is illustrated in FIG. 20 where the existing corner node is $N_i$ and five new nodes $N_j$, $N_k$, $N_l$, $N_m$ and $N_n$ extend from the vectors $V_j$, $V_k$, $V_l$, $V_m$ and $V_n$, respectively and originate at $N_i$. The vectors $V_j$, $V_k$, $V_l$, $V_m$ and $V_n$ are respectively oriented at the clockwise $\frac{1}{8}$, $\frac{3}{8}$, $\frac{1}{2}$, $\frac{5}{8}$ and $\frac{7}{8}$ bisections of the interior angle $\alpha$ of the node $N_i$. The magnitudes of the vectors are given by the equations:

$$|V_j| = \frac{(d_1 + d_2)/2}{\sin(\alpha/4)} \quad [12]$$

$$|V_k| = \sqrt{2}\ |V_j| \quad [13]$$

$$|V_l| = |V_j| \quad [14]$$

$$|V_m| = |V_k| \quad [15]$$

$$|V_n| = |V_j| \quad [16]$$

Three new quadrilateral elements are added to the mesh as illustrated in FIG. 20 and are defined by the nodes $N_i$, $N_{i-1}$, $N_{j-1}$ and $N_j$, the nodes $N_i$, $N_j$, $N_k$ and $N_l$ and the nodes $N_i$, $N_l$, $N_m$ and $N_n$. The row reversal node usually produces two new row corner nodes. A row reversal node can only occur on the permanent boundary because the first row immediately buries the large interior angle.

Figure 21:
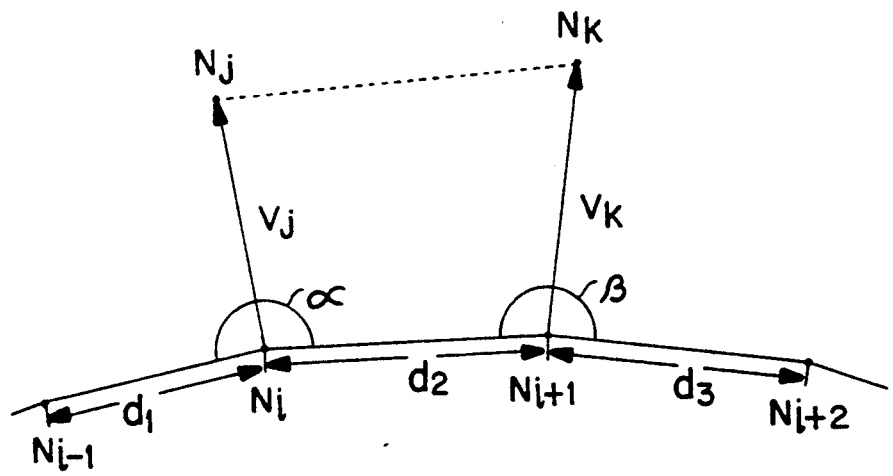
FIG. 21 illustrates the projection to begin a row with only side nodes during row generation according to the present invention.

Of the special cases illustrated in FIGS. 16(A)-16(C), only the case of a row with only row side nodes requires an additional projection scheme. The projection to begin a row with only side nodes is illustrated in FIG. 21. The beginning and ending node is $N_i$ and two new nodes $N_j$ and $N_k$ extend from the vectors $V_j$ and $V_k$ respectively which originate at $N_i$ and $N_{i+1}$, respectively. $V_j$ is oriented to bisect the interior angle $\alpha$ at $N_i$ and $V_k$ is oriented to bisect the interior angle $\beta$ at $N_{i+1}$. The magnitudes of the vectors are given by the equations:

$$|V_j| = \frac{(d_1 + d_2)/2}{\sin(\alpha/2)} \quad [17]$$

$$|V_k| = \frac{(d_2 + d_3)/2}{\sin(\beta/2)} \quad [18]$$

The distances $d_1$-$d_2$ are as defined above. A new element defined by the nodes $N_i$, $N_j$, $N_k$ and $N_{i+1}$ is added to the mesh. As illustrated in FIG. 21, the projection from an all side node row generates two row end nodes which propagate and eventually terminate the forming row.

Figure 22:
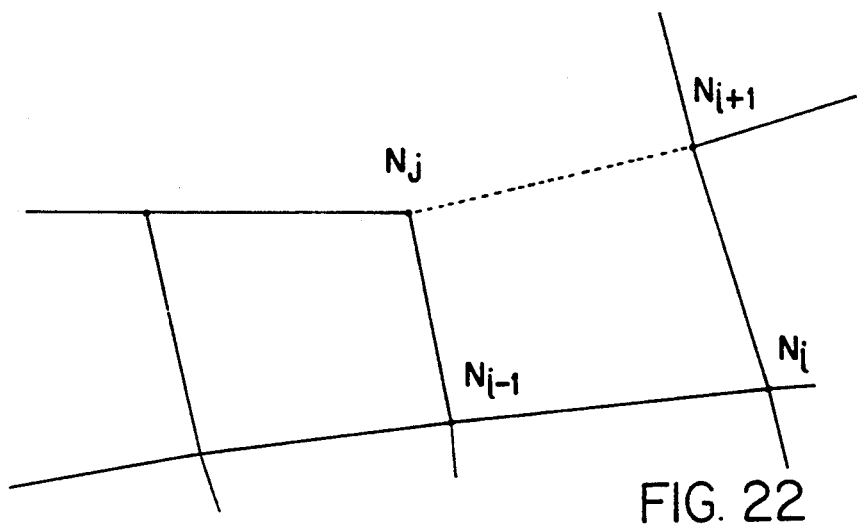
FIG. 22 illustrates row termination during row generation in the present invention.

With each of the propagations described above, the node projected from becomes a new row end node in effect. Therefore, when the row has progressed such that the next node $N_i$ in the row is the predetermined ending node of the row, the row is terminated by simply closing the final element in the row as illustrated in FIG. 22. As a result, the final element in the row is defined by the nodes $N_{i-1}$, $N_j$, $N_{i+1}$ and $N_i$ as illustrated in FIG. 22.

Figure 7:
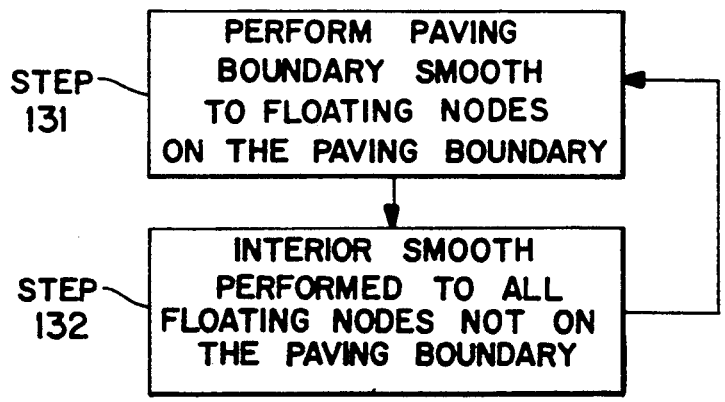
FIG. 7 illustrates a flow chart for smoothing in the paving technique for the present invention.

After rows are added, after intersections are completed and essentially after every modification to the mesh, a smoothing step 130 is used to restore and maintain element size, perpendicularity, and overall paving boundary and mesh smoothness. In the smoothing step 130, a free boundary must be maintained as the paving boundary moves from the fixed permanent boundary toward the interior of region. Accordingly, a three-step smoothing process is used for the paving technique as illustrated in FIG. 7. First, all nodes that are not on the paving boundary are fixed and a smooth is applied to any floating node on the paving boundary in a paving boundary smooth step 131. Next, all paving boundary nodes are fixed and all floating nodes, which are not paving boundary nodes, are smoothed in an interior smooth step 132. Finally, the paving boundary smooth step 131 is repeated.

The paving boundary smooth step 131 is a modified isoparametric smooth that is limited to nodes on the current paving boundary that are not part of the permanent boundary. As discussed above, the permanent boundary nodes are never free to move. To begin the smoothing process, the node movement based on a true isoparametric smooth is calculated as disclosed in "Laplacian-Isoparametric Grid Generation Scheme," Journal of Engineering Mechanics, October, 1976, pp. 749-756. Defining $V_i$ as a vector from the origin to a node $N_i$ and assuming that $N_i$ is attached to n elements, $V_{mj}$, $V_{mk}$ and $V_{ml}$ are vectors from the origin to nodes $N_j$, $N_k$ and $N_l$ of the $m^{th}$ element, respectively. The nodes must be in a clockwise or counterclockwise order around the element. A new vector $V'_i$ from the origin to the proposed new location of the node $N_i$ is given by the equation:

$$V'_i = \frac{1}{n} \sum_{m=1}^{n} V_{mj} + V_{ml} - V_{mk} \quad [19]$$

$\Delta_A$ which defines the change in location of the node $N_i$ for a true isoparametric smooth is given by the equation:

$$\Delta_A = V'_i - V_i \quad [20]$$

The isoparametric smoother adjusts the nodes such that the elements are more nearly parallelpipeds. However, it does not necessarily maintain the desired element size or the desired squareness of the element. This becomes a problem for paving nodes that are attached to two elements which are usually boundary side nodes and constitute a majority of most boundary nodes during paving. For such paving nodes, the change in node location is modified to reflect a desired length and a desired angular smoothness.

Figure 23:
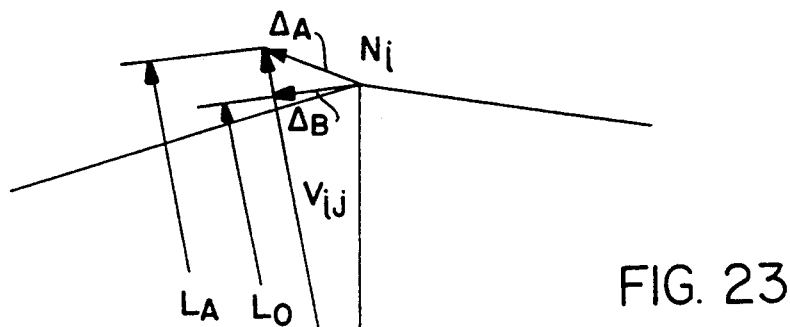
FIG. 23 illustrates forming a node during the smoothing operation of the present invention.

In the desired length criteria, a node $N_j$ opposite the node $N_i$ on the common boundary between the two elements attached to the node $N_i$ is illustrated in FIG. 23. $V_i$ and $V_j$ are the vectors from the origin to the nodes $N_i$ and $N_j$, respectively, and $1_D$ is the desired length of node $N_i$ which is the length of the projection vector used to initially generate the node and $1_A$ is the length of a vector $V_{ij}$ from the node $N_i$ to the new location of $N_j$ determined from the isoparametric smooth (i.e. to the tip of the vector $V_i$). A modified change in the position vector $\Delta_B$ is given by the equation:

$$\Delta_B = V_j - V_i + (\Delta_A + V_i - V_j)\frac{1_D}{1_A} \quad [21]$$

This adjustment relates to a length adjustment of the vector $V_{ij}$ without adjusting its orientation. This helps protect the desired size of the element being generated as well as the aspect ratio. However, the perpendicularity of the element corners is not guaranteed.

Figure 24:
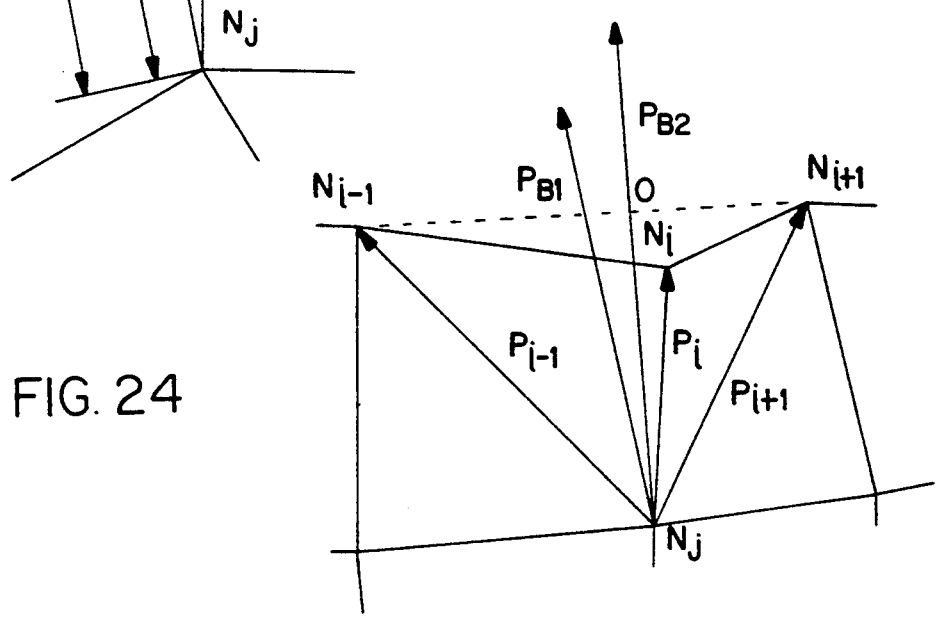
FIG. 24 illustrates angular smoothing in the present invention.

The desired angular smoothness is the final adjustment during the paving boundary smooth step. FIG. 24 illustrates the node $N_j$ opposite to the node $N_i$ on the common boundary and the nodes $N_{i-1}$ and $N_{i+1}$ are the preceding and following nodes to the node $N_i$ on the boundary. The vectors $P_i$, $P_{i-1}$ and $P_{i+1}$ extend from the node $N_j$ to the nodes $N_i$, $N_{i-1}$ and $N_{i+1}$, respectively. A new vector $P_{B1}$ bisects the angle between the vectors $P_{i-1}$ and $P_{i+1}$ and a new vector $P_{B2}$ indicates the adjusted location of the node $N_i$ originating from the node $N_j$ and having a direction defined along the angle bisector of the angle between $P_{B1}$ and $P_i$. The length of the vector $P_{B2}$ is determined by calculating the location of a point Q between $P_{B2}$ and a line connecting the nodes $N_{i-1}$ and $N_{i+1}$. The length from the point Q to the node $N_j$ is $1_Q$ and the original projection length of $N_i$ is $1_D$. The length of the vector $P_{B2}$ is defined by the equation:

$$|P_{B2}| = \frac{1_Q + 1_D}{2} \text{ if } 1_D/1_Q \quad (22)$$

$1_D$ otherwise

The new location for $N_i$ based on angular smoothness is now defined and the change in the position vector for angle smoothness $\Delta_c$ is defined by the equation:

$$\Delta_c = P_{B2} - P_i \quad [23]$$

The angle smoothness adjustment keeps quadrilateral elements perpendicular at the corners and helps to maintain a smooth paving boundary. The final change in the location vector $\Delta_i$ for the node $N_i$ attached to only two elements on the boundary is defined by the equation:

$$\Delta_i = \frac{\Delta_B + \Delta_C}{2} \quad [24]$$

For nodes on the boundary which are attached to more or less than two elements, the change in location is based solely on the isoparametric smooth vector $\Delta_A$. The row smooth is critical to the correct formation of rows and also converges quickly, usually in three or four iterations.

Figure 25:
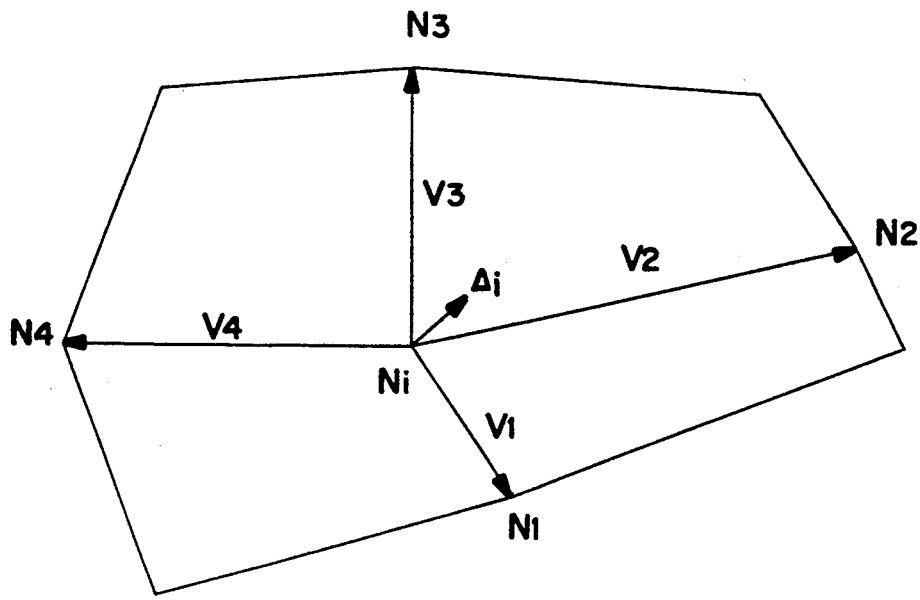
FIG. 25 illustrates interior node smoothing for the present invention.

All boundary nodes are fixed and the remaining floating nodes are smoothed after the initial paving boundary smooth. A modified length-weighted Laplacian smoother is used which has a set of vectors from an interior node to all attached nodes. A contributing vector $C_j$ is the vector contribution of an attached node $N_j$ when the interior node $N_i$ is smoothed. The vector $V_j$ extends from the node $N_i$ to the node $N_j$ as illustrated in FIG. 25. If the node $N_j$ is not on a permanent boundary, the contributing vector $C_j$ is equivalent to the vector $V_j$. If the node $N_j$ is on a permanent boundary, then the vector $C_j$ is defined by the equation:

$$C_j = V_j + \Delta C_j \quad [25]$$

where $\Delta C_j$ is defined by the angular smoothness criteria defined in equation [23]. $\Delta_i$ is the vector defining the change in location of the node $N_i$ and is the sum of all contributing vectors from the attached nodes weighted by the length of the contributing vectors. If n nodes are attached to the node $N_i$ as illustrated in FIG. 25, then:

$$\Delta_i = \frac{\sum_{j=1}^{n} |C_j| C_j}{\sum_{j=1}^{n} |C_j|} \quad [26]$$

The modification to the length weighted Laplacian keeps the quadrilateral elements along the exterior of the region perpendicular to the boundary. It also tends to move the nodes an equal distance from attached neighboring nodes and converges rapidly.

A localized smooth is used to minimize costs because smoothing is often repeated and therefore a fairly expensive procedure. If a smooth mesh is changed through some local operation, it is reasonable to assume that during the subsequent smooth, nodes closer to the disturbance will require more adjustment than the more distant nodes. Because nodes buried more than three element layers from the disturbance rarely move significantly, smoothing has been restricted to nodes connected within three element layers to any node involved in a disturbance for saving analysis time.

Figure 8:
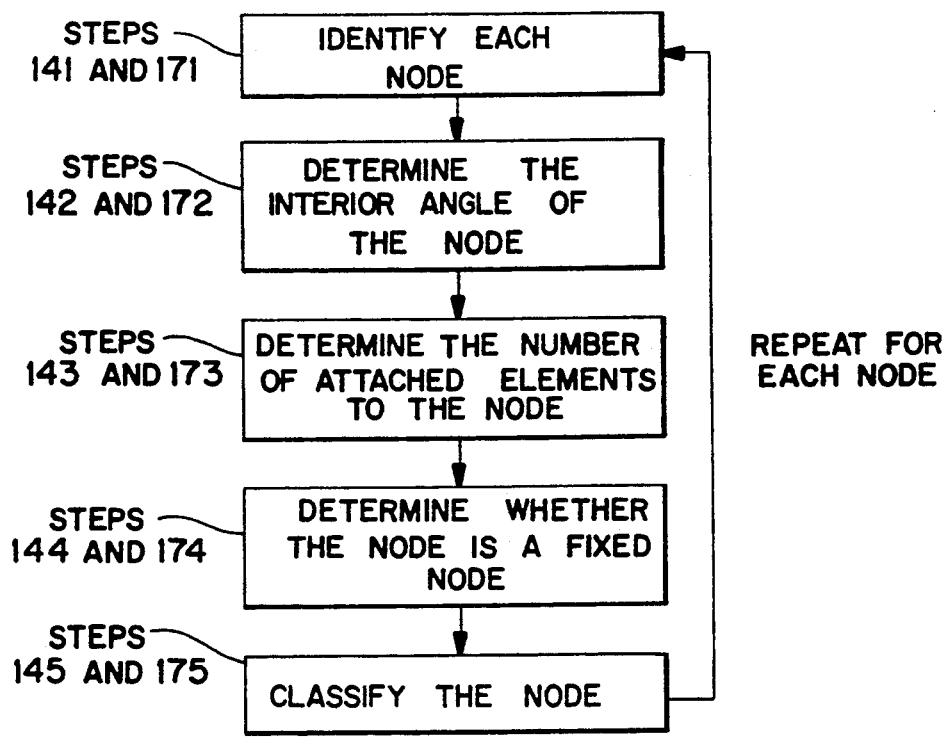
FIG. 8 illustrates seeming in the paving technique for the present invention.

Seaming a boundary at steps 140 and 170 closes the cracks in a paving boundary which often form during the paving process. The cracks are easily recognized as boundary nodes having very small interior angles. Each node is identified at steps 141 and 171, the appropriateness of seaming a crack is determined based on the interior angle $\alpha$ of the node at steps 142 and 172, the number of attached element edges, $N_E$, at steps 143 and 173 and whether the node is a fixed node at steps 144 and 174 as illustrated in FIG. 8 and pages 18-20 of the pseudo code appendix, which is located in the patented file. Three types of seams classified at steps 145 and 175 are a seam of a floating paving boundary (an interior node seam), a seam of a fixed node and a seam between two element sides of unequal length (a transition seam). Steps 141-145 and 171-175 are repeated for each node to seam the boundary.

Interior node seams are the most common type of seams on a paving boundary. Such nodes may be seamed if:

$$\alpha < \epsilon_1 \text{ for } N_\epsilon \geq 5 \quad [27]$$

$$\alpha < \epsilon_2 \text{ otherwise} \quad [28]$$

-continued where $\epsilon_1 < \epsilon_2$.

As seen in these equations, the seaming tolerance increases as the number of attached elements increase. This seaming tolerance shift favors seams which will form a regular node or reduce the irregularity of the node at the crack tip. Each seam is performed by simply combining the preceding node and the following node into a new single node. Forming the seams reduces the number of element edges attached to the node by one. Once a crack begins to close, the seam tends to continue until a fairly square corner is formed.

Forming a seam of a fixed node on a permanent boundary must be performed more judiciously because exterior nodes are not free to move and smoothing cannot improve elements which have two or more sides on an exterior boundary. To avoid creating a seam with quadrilateral elements having bad interior angles which cannot be improved, the closure of cracks is delayed when the exterior boundary forms small angles.

For paving boundaries with transitioning requirements, a transition seam may be required between two element sides of disproportionate sizes. Before any seam is performed, the relative lengths of the two element sides to be seamed are compared. If the ratio of the longer side to the shorter side is greater than a threshold value (2.5, for example), then a wedge element (which will be explained below) is added to the mesh. The wedge is positioned to effectively cut the longer side element into thirds and the new arrangement of elements is seamed. The insertion of a wedge during the seaming operation allows graceful transitions in otherwise difficult boundary closure situations.

Figure 26:
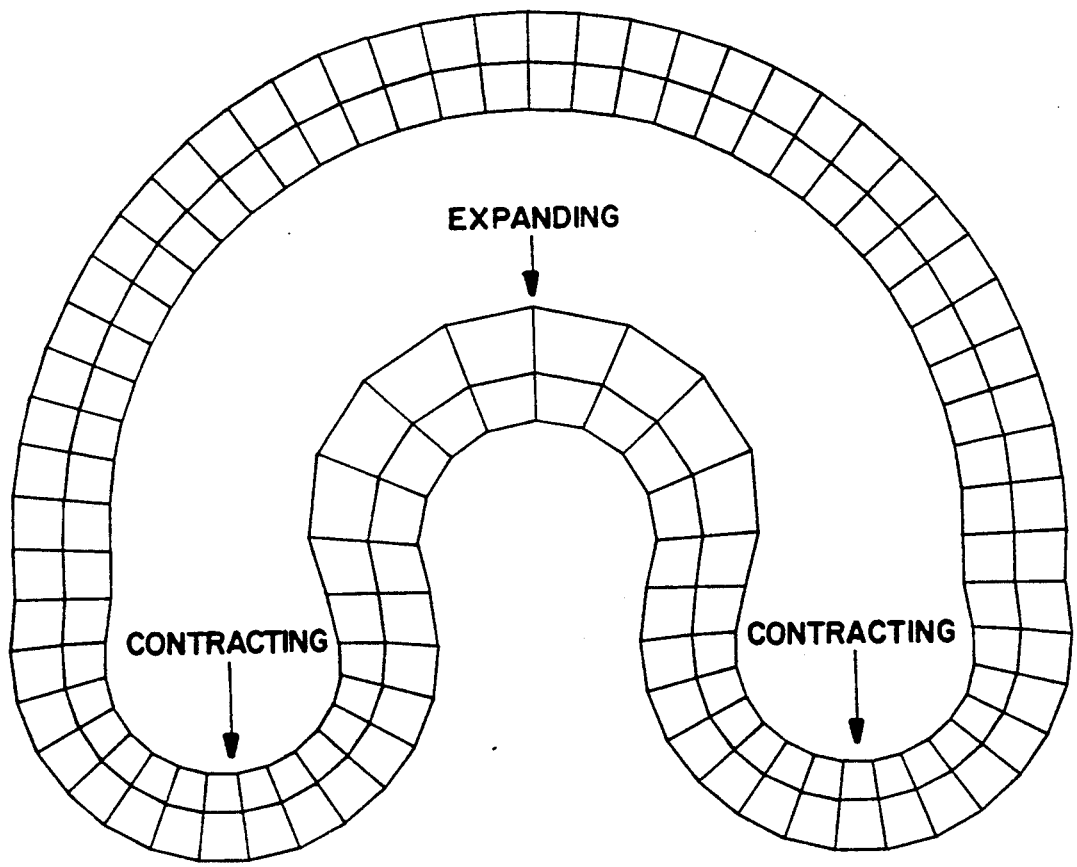
FIG. 26 illustrates expanded and contracted quadrilateral elements that may occur during row addition in the present invention.

As rows are added to the mesh, undesired expansion or contraction of the quadrilateral element sizes may occur as illustrated in FIG. 26. After seaming a boundary, a determination of whether the row is complete is made at step 180. If the row is determined to be complete at step 180, the undesired expansion and contraction may be corrected with appropriate row adjustments at step 190, such as the insertion of wedges in expanding rows and the formation of tucks in contracting rows. If the row is determined not to be complete at step 180, a row portion is added at step 120 as discussed previously.

The insertion of wedges are used to check the growth of the size of elements in portions of a boundary row by cracking the row at a floating paving boundary node and forcing an additional element into the crack. The new wedge element separates two previously connected elements and forms a row corner node in the row. Wedge insertion includes the generation of two new nodes and one new wedge element as illustrated in FIGS. 27(A)-27(C). In FIG. 27(A), a new node $N_i'$ is generated to replace the original node $N_i$ and the node $N_i$ is repositioned on an imaginary line joining the node $N_{i-1}$ and the original position of the node $N_i$ at a distance of ⅓ the original distance from the node $N_i$ to $N_{i-1}$. Similarly, the node $N_{i'}$ is positioned on an imaginary line joining the original position of the node $N_i$ and the node $N_{i+1}$ at a distance of ⅓ the original distance from the node $N_i$ to $N_{i+1}$ which forms the crack as described above. The second new node $N_k$ is then placed at a location defined by using the isoparametric smoothing equation for $V_{i'}$ with the nodes $N_i$, $N_j$ and $N_{i'}$ in the equation. The new element is defined by the nodes $N_i$, $N_j$, $N_{i'}$ and $N_k$ as illustrated in FIG. 27(B). Smoothing is then performed to develop a mesh as illustrated in FIG. 27(C).

Figure 9:
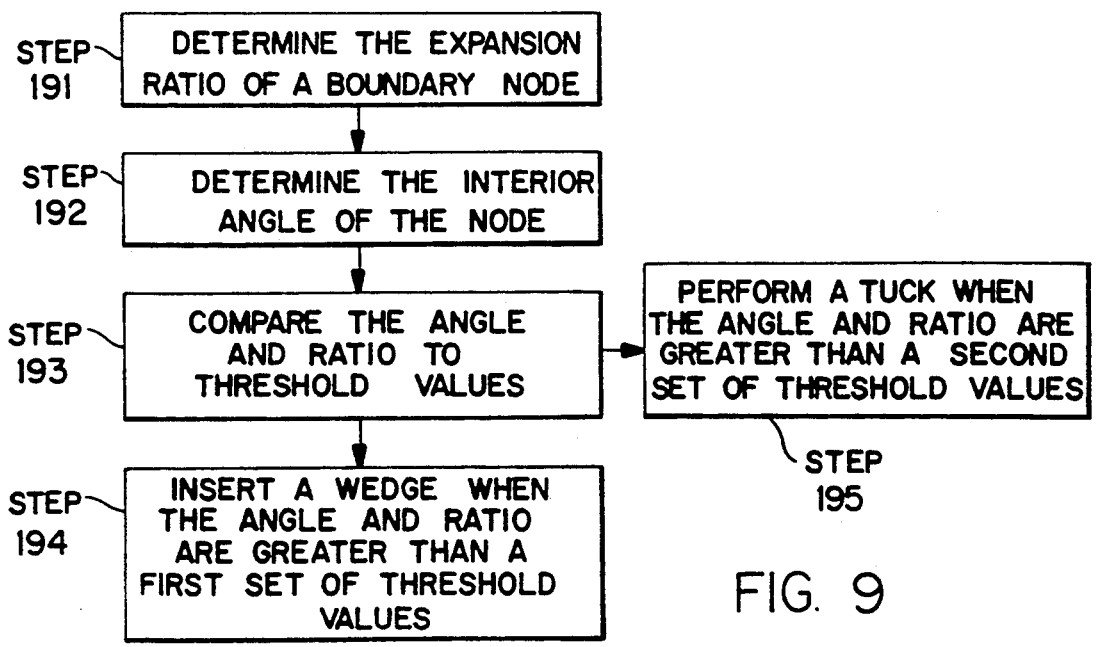
FIG. 9 illustrates row adjusting in the paving technique for the present invention.

Whether wedge insertions would be beneficial for row portions are based on a comparison at step 193 of an expansion ratio of the desired length to the actual distance between adjacent paving boundary nodes determined at step 191 and on the interior angle of the node determined at step 192 as illustrated in FIG. 9 and pages 21-24 of the pseudo code appendix, which is located in the patented file. If the expansion ratio and the interior angle are both greater than threshold values (an expansion ratio threshold of 1.25 and interior angle threshold of 183° for example) then the node qualifies for the insertion of a wedge at step 194. The actual number of wedges and the location of the wedges is based on the number of sequential paving boundary nodes that qualify for wedge insertion and the total angle traversed by the boundary for the sequential set of nodes. The optimum wedge placement would be at the mid-point of every $\pi/2$ portion of the total angle traversed by the sequential set of paving boundary nodes.

The formation of tucks are used to reduce the size of elements in portions of a boundary row by combining two adjacent row quadrilateral elements into one quadrilateral element to create a row end node where three row side nodes previously existed. The tuck formation eliminates two boundary nodes and one quadrilateral element. FIGS. 28(A)-28(D) illustrate the formation of a tuck at the node $N_i$ where an element side $S_A$ connecting the nodes $N_i$ and $N_j$ are detected. The element attached to the side $S_A$ is the one deleted as illustrated in FIG. 28(B). The tuck is completed by superimposing the sides $S_B$ and $S_C$ on sides $S'_B$ and $S'_C$ respectively as illustrated in FIG. 28C. This overlay replaces the node $N_j$ with a node $N_l$ and the node $N_{j+1}$ with the node $N_i$. The formation of the tuck is completed with a smooth to produce the mesh as illustrated in FIG. 28(D).

Whether the tuck formations are beneficial are based on whether a reduction ratio of the desired length to the actual distance between adjacent boundary nodes and the interior angle of the node. If the expansion ratio and on the interior angle are both less than threshold values (a reduction ratio threshold of 0.8 and an interior angle threshold of 177°, for example), then the node qualifies for the formation of a tuck at step 195. The actual number of tucks and their location is based on the number of sequential boundary nodes that qualify for tuck formation and the total angle traversed by the boundary for the sequential set of nodes. The optimum tuck placement would be at a mid-point of every $\pi/2$ portion of the total angle traversed.

As the paving boundaries propagate into the region, the boundaries may be detected to intersect or overlap existing portions of the mesh at steps 150 and 200. If an intersection is detected, intersection processing is performed and overlaps are connected and boundaries are seamed at steps 160 and 170 and at steps 210 and 220 respectively. If no intersections are detected at step 150, the determination of whether the row is complete is made at step 180 as previously discussed and if no intersections are detected at step 200, the closure check is performed at step 230 as previously discussed. The intersection overlaps that may occur of a single paving boundary crossing itself is illustrated in FIG. 29(A) and a paving boundary crossing another paving boundary in FIG. 29(B).

When a paving boundary is illustrated is determined to overlap itself at steps 151 and 201, at least two pairs of lines intersect each other and the intersection is detected by calculating the intersection of two straight line segments by conventional methods as illustrated in FIG. 10 and pages 25-28 of the pseudo code appendix, which is located in the patented file. Once an intersection has been detected, the intersection is corrected by connecting the overlapping portions in the best possible manner at steps 160 and 210 and then seaming the boundary at steps 170 and 220. When a single boundary is detected to intersect itself at steps 152 and 202, the connection will result in two new paving boundaries being formed and the best connection will be between the two lines that intersect in most cases. However, it is often more advantageous to combine lines adjacent to the intersection lines on either side in either direction.

For evenness constraints, a forward/backward search exploring size differences and parallelness of all intersections is performed to ensure that the connection formed will be valid and avoid the formation of irregular nodes. In considering the evenness constraints, the two new paving boundaries must each contain an even number of paving nodes. If connecting the intersecting lines will produce paving boundaries having an odd number of nodes, the connection location is adjusted based on the relative location of the intersection. Once the evenness constraint has been met, a search is performed to see if a more desirable connection exists adjacent to the designated connection. Connecting lines one step in either direction is compared based on the nearness of the lines and the closeness of the lines to being parallel. After this comparison is completed, size differences are considered when the length of the respective intersecting lines differ significantly. A wedge may be inserted to enable an easier transition. Because there will always be more than one intersection of a closed paving boundary upon itself, all intersections are explored. The connection is finally performed by connecting the best intersection pair and then performing the step of seaming. In doing so, at least one more intersection location will be eliminated. Since multiple intersections may occur with the addition of any row, each of the newly formed paving boundaries are themselves checked for any remaining intersections before proceeding.

When a paving region contains interior paving boundaries (holes), the interior paving boundaries must all be eventually connected before closure is possible. The existence of intersections is determined at steps 153 and 203 similar to the intersection checking performed for a single boundary intersecting itself. It is not possible, however, to generate an odd boundary loop from the connection of any two paving boundaries because each boundary must contain an even number of intervals. As a result, the quality of the connection is based only on the nearness and parallelness of the two edges. This type of intersection may occur between the external and internal paving boundary or between any two internal paving boundaries.

Figure 11:
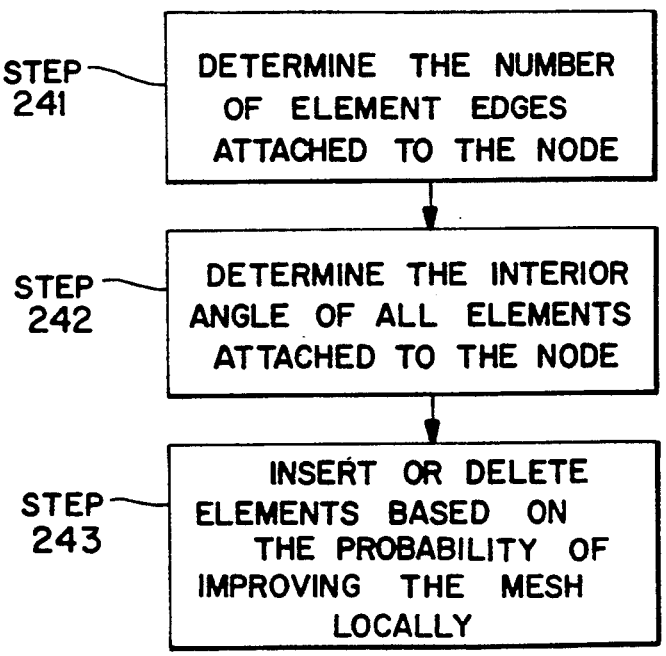
FIG. 11 illustrates a flow chart for cleaning up in the paving technique for the present invention.

After the region has been completely paved, local adjustments are made to improve the overall quality of the finished mesh at step S240. The adjustments are essentially insertions or deletions of quadrilateral elements to improve the local aspect ratios, reduce the number of irregular nodes or eliminate elements having poor interior angles. The adjustments are controlled by detecting the number of element edges attached to a node at step 241, the interior angle of all elements attached to the node at step 242 and the anticipated probability of improving the mesh locally at step 243 as illustrated in FIG. 11 and pages 5-7 of the pseudo code appendix, which is located in the patented file.

The method and apparatus for automatically generating an all-quadrilateral mesh in an arbitrary geometry of an object is robust and operates at a high speed for complex geometries in extreme mesh gradations. The paving technique tends to place well formed elements along the boundary with irregular nodes in the interior of the geometry. This paving technique may be combined with an error-estimator for iterative adaptive analysis for enhanced operations in finite element analysis and with 3-D trim surface meshing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automated system for quadrilateral surface discretization of a geometric region, comprising:
   means for inputting a permanent boundary on the exterior of the geometric region; and
   processing means for iteratively layering rows of quadrilateral elements inward from said permanent boundary to the interior of the geometric region to form a mesh of the quadrilateral elements defining the geometric region;
   wherein said processing means defines a plurality of fixed nodes along said permanent boundary, generates a paving row including the layered rows of quadrilateral elements around the inside of said boundary, smooths said paving row of said boundary, seams said paving row of said boundary, detects when said paving row intersects itself or when said paving row intersects an existing portion of said mesh and connects the intersection portions, determines whether said paving row includes contracting or expanding quadrilateral elements and adjusts said paving row by inserting wedges or forming tucks, determines when six or less nodes remain in said paving row and completes said paving row by forming a seam or adding additional quadrilateral elements when six or less nodes remain, and inserts or deletes elements to improve local aspect ratios, reduce the number of irregular nodes and eliminate elements having interior angles less than a predetermined value to complete said paving row.

2. The automated system of claim 1, wherein said mesh of the quadrilateral elements is boundary sensitive.

3. The automated system of claim 1, wherein said mesh of the quadrilateral elements is orientation insensitive.

4. The automated system of claim 1, wherein substantially all of the quadrilateral elements formed by said mesh at said permanent boundary comprises regular nodes.

5. The automated system of claim 1, wherein said system generates said mesh of the quadrilateral elements for use in finite element analysis of the reaction of said geometric region to a stimulus responsive to an input by an operator.

6. The automated system of claim 5, wherein said finite element analysis is performed by a finite element analysis system including receiving means for receiving the stimulus introduced to model the geometric region and analyzing means for performing finite element analysis on the geometric region to produce analysis data.

7. The automated system of claim 1, wherein said processing means selects a starting node for said paving row by classifying each of the nodes in said boundary, determines whether the nodes form a primitive shape and defines a floating node for one of the quadrilateral elements when generating said paving row.

8. The automated system of claim 7, wherein the node classifications comprise row end nodes, row side nodes, row corner nodes and row reversal nodes.

9. The automated system of claim 7, wherein the nodes are classified based on whether an interior angle of each node is within a predetermined angle tolerance.

10. The automated system of claim 7, wherein said processing means detects an interior angle of the nodes of said paving row, determines the number of attached element edges to the nodes of said paving row and determines whether the nodes are fixed nodes when seaming said paving row of said boundary.

11. The automated system of claim 7, wherein said processing means determines whether the intersecting portions form two new boundaries having an odd number of nodes and adjusts the connection if an odd number of nodes exist when connecting the intersecting portions.

12. The automated system of claim 7, wherein said processing means compares the intersecting portions with intersecting portions one step forward and backward to determine whether a connection should be completed when connecting the intersecting portions.

13. The automated system of claim 7, wherein said processing means determines an expansion ratio of a desired length to the distance between adjacent nodes in said paving row, inserts a wedge between the adjacent nodes when said expansion ratio and said interior angles of the nodes are greater than a first set of predetermined threshold values and forms a tuck by combining two adjacent quadrilateral elements into one quadrilateral element when said expansion ratio and said interior angles of the nodes are less than a second set of predetermined threshold values when adjusting said paving row by inserting wedges or forming tucks.

14. The automated system of claim 7, wherein said processing means completes said paving row with a simple seam when two nodes remain, adds an additional quadrilateral element when four nodes remain and adds two, three or four quadrilateral elements based on the node configuration when six nodes remain when completing said paving row by forming said seams or adding additional quadrilateral elements.

15. The automated system of claim 7, wherein said processing means seams an interior node, seams a fixed node and seams a transition when seaming said paving row of said boundary.

16. The automated system of claim 15, wherein said processing means combines the preceding and following nodes to form a seamed node of each node having said interior angle less than a first predetermined angle and the number of attached elements greater than or equal to 5 or said interior angle less than a second predetermined angle greater than said first predetermined angle when seaming said interior angle.

17. The automated system of claim 15, wherein said processing means combines the preceding and following nodes of the fixed nodes of said paving row to form a seamed node when only one side of the quadrilateral element including the node is on an exterior boundary of the geometric region when seaming said fixed node.

18. The automated system of claim 15, wherein said processing means compares the lengths of first and second element sides of the quadrilateral elements and inserts a wedge element if the ratio of said first element side to said second element side or the ratio of said second element side to said first element side is greater than a predetermined value when seaming said transition seam.

19. The automated system of claim 7, wherein said processing means smooths a paving boundary and an interior boundary of said permanent boundary separately when smoothing said paving row of said boundary.

20. The automated system of claim 19, wherein said processing means smooths said floating nodes failing to be on said paving row of said boundary when smoothing said interior boundary.

21. The automated system of claim 19, wherein said processing means fixes nodes failing to be on said paving row of said boundary and smooths said floating nodes on said paving row when smoothing said paving boundary.

22. The automated system of claim 21, wherein said processing means adjusts a length and angle of said floating nodes from said fixed nodes when smoothing said paving boundary.

23. An automated system for quadrilateral surface discretization of a geometric region having interior and exterior boundaries defining a geometric region interior, comprising:
means for inputting the permanent boundaries of the geometric region including an interior permanent boundary and an exterior permanent boundary; and
processing means for iteratively layering rows of quadrilateral elements outward from said interior permanent boundary to the geometric region exterior and inward from said exterior permanent boundary to the geometric region interior to form a mesh of the quadrilateral elements defining the geometric region, said processing means alternatively layering rows outward from said interior boundary and inward from said exterior boundary until the entirety of the geometric region interior is discretized, respectively.

24. The system of claim 23, wherein said processing means includes,
external layering means for developing a row of discrete elements inward from the exterior boundary in a counterclockwise direction toward the geometric region interior;
interior layering means for developing a row of discrete element outward from the interior boundary in a clockwise direction toward the geometric region interior; and
means for alternatively switching between said external layering means and said external layering means to completely layer rows of quadrilateral elements throughout the entirety of the geometric region interior.

25. The automated system of claim 23, wherein said mesh of the quadrilateral elements is boundary sensitive.

26. The automated system of claim 23, wherein said mesh of the quadrilateral elements is orientation insensitive.

27. The automated system of claim 23, wherein substantially all of the quadrilateral elements formed by said mesh at said permanent boundaries comprise regular nodes.

28. An automated mesh generator according to claim 23, wherein said processing means determines whether one external or internal row contains six or less fixed and floating nodes, determines the location of a subsequent external or interior paving boundary row to said one external or interior paving boundary row by classifying said fixed and floating nodes, smooths said external and interior paving boundary row to maintain a desired size of said quadrilateral elements of said first and second meshes, seams said external and interior paving boundary rows to close cracks between adjacent external and interior paving boundary rows, respectively, and adjusts said external and interior paving boundary rows to prevent expansion and contraction of said quadrilateral elements of said first and second meshes.

29. The automated system of claim 23, wherein said system generates said mesh of the quadrilateral elements for use in finite element analysis of the reaction of said geometric region to a stimulus responsive to an input by an operator.

30. The automated system of claim 29, wherein said finite element analysis is performed by a finite element analysis system including receiving means for receiving the stimulus introduced to model the geometric region and analyzing means for performing finite element analysis on the geometric region to produce analysis data.

31. In a finite element analysis method comprising generating a mesh of quadrilateral elements defining a geometric region to be analyzed, introducing a stimulus responsive to an input by an operator to which the response of the geometric region is to be modeled, performing finite element analysis on the geometric region in response to the stimulus to produce analysis data, and using the resulting analysis data, a method of automatically generating a mesh of quadrilateral elements comprising the steps of:

inputting a permanent boundary on the exterior of the geometric region; and iteratively layering rows of quadrilateral elements inward from said permanent boundary to the interior of the geometric region to form the mesh of the quadrilateral elements defining the geometric region, said step of iteratively layering including the steps of, defining a plurality of fixed nodes along said permanent boundary, generating a paving row including the layered rows of quadrilateral elements around the inside of said boundary, smoothing said paving row of said boundary, seaming said paving row of said boundary, detecting when said paving row intersects itself or when said paving row intersects an existing portion of said mesh and connecting the intersecting portions, determining whether said paving row includes contracting or expanding quadrilateral elements and adjusting said paving row by inserting wedges or forming tucks, determining when six or less nodes remain in said paving row and completing said paving row by forming a seam or adding additional quadrilateral elements when six or less nodes remain, and inserting or deleting elements to improve local aspect ratios, reduce the number of irregular nodes and eliminate elements having interior angles less than a predetermined value to complete said paving row.

32. The automated system of claim 31, wherein said mesh of the quadrilateral elements is boundary sensitive.

33. The automated system of claim 31, wherein said mesh of the quadrilateral elements is orientation insensitive.

34. The method of claim 31 wherein substantially all of the quadrilateral elements formed by said mesh at said permanent boundary comprise regular nodes.

35. In a finite element analysis method comprising generating a mesh of quadrilateral elements defining a geometric region to be analyzed having interior and exterior boundaries, introducing a stimulus responsive to an input by an operator to which the response of the geometric region is to be modeled, performing finite element analysis on the geometric region in response to the stimulus to produce analysis data, and using the resulting analysis data, a method of automatically generating a mesh of quadrilateral elements comprising the steps of:

inputting the permanent boundaries of the geometric region including an interior permanent boundary and an exterior permanent boundary; and iteratively layering rows of quadrilateral elements outward from said interior permanent boundary to the geometric region exterior and inward from said exterior permanent boundary to the geometric region interior to form the mesh of the quadrilateral elements defining the geometric region, said rows being alternatively layered outward from said interior boundary and inward from said exterior boundary until the entirety of the geometric region interior is discretized, respectively.

36. The method of claim 35, wherein the mesh of the quadrilateral elements is boundary sensitive.

37. The method of claim 35, wherein the mesh of the quadrilateral elements is orientation insensitive.

38. The method of claim 35, wherein substantially all of the quadrilateral elements formed by said mesh at said permanent boundary comprise regular nodes.

39. A method of automatically surface discretizing a geometric region into a plurality of quadrilateral elements, comprising the steps of:

(a) inputting a permanent boundary on the exterior of the geometric region; and (b) iteratively layering rows of quadrilateral elements inward from said permanent boundary to the interior of the geometric region to form a mesh of the quadrilateral elements defining the geometric region, said step (b) including the steps of, (b)(1) defining a plurality of fixed nodes along said permanent boundary, (b)(2) generating a paving row including the layered rows of quadrilateral elements around the inside of said boundary, (b)(3) smoothing said paving row of said boundary, (b)(4) seaming said paving row of said boundary, (b)(5) detecting when said paving row intersects itself or when said paving row intersects an existing portion of said mesh and connecting the intersecting portions, (b)(6) determining whether said paving row includes contracting or expanding quadrilateral elements and adjusting said paving row by inserting wedges or forming tucks, (b)(7) determining when six or less nodes remain in said paving row and completing said paving row by forming a seam or adding additional quadrilateral elements when six or less nodes, and (b)(8) inserting or deleting elements to improve local aspect ratios, reduce the number of irregular nodes and eliminate elements having interior angles less than a predetermined value to complete said paving row.

40. The method of claim 39, wherein the mesh of the quadrilateral elements is boundary sensitive.

41. The method of claim 39, wherein the mesh of the quadrilateral elements is orientation insensitive.

42. The method of claim 39, wherein substantially all of the quadrilateral elements formed by said mesh at said permanent boundary comprise regular nodes.

43. The method of claim 39, wherein said step (b)(1) comprises the steps of selecting a starting node for said paving row by classifying each of the nodes in said boundary, determining whether the nodes form a primitive shape and defining a floating node for one of the quadrilateral elements.

44. The method of claim 43, wherein the node classifications comprise row end nodes, row side nodes, row corner nodes and row reversal nodes.

45. The method of claim 43, wherein the nodes are classified based on whether an interior angle of each node is within a predetermined angle tolerance.

46. The method of claim 43, wherein said step (b)(4) comprises the steps of detecting an interior angle of the nodes of said paving row, determining the number of attached element edges to the nodes of said paving row and determining whether the nodes are fixed nodes.

47. The method of claim 43, wherein said step (b)(5) comprises the step of determining whether the intersecting portions form two new boundaries having an odd number of nodes and adjusting the connection if an odd number of nodes exist.

48. The method of claim 43, wherein said step (b)(5) comprises the step of comparing the intersecting portions with intersecting portions one step forward and backward to determine whether a connection should be completed.

49. The method of claim 43, wherein said step (b)(6) comprises the steps of determining an expansion ratio of a desired length to the distance between adjacent nodes in said paving row, intersecting a wedge between the adjacent nodes when said expansion ratio and said interior angles of the nodes are greater than a first set of predetermined threshold values and forming a tuck by combining two adjacent quadrilateral elements into one quadrilateral element when said expansion ration and said interior angles of the nodes are less than a second set of predetermined threshold values.

50. The method of claim 43, wherein said step (b)(7) comprises the steps of completing said paving row with a simple seam when two nodes remain, adding an additional quadrilateral element when four nodes remain and adding two, three or four quadrilateral elements based on the node configuration when six nodes remain.

51. The method of claim 43, wherein said step (b)(3) comprises the steps of paving boundary smoothing and interior smoothing.

52. The method of claim 51, wherein said step of interior smoothing comprises the step of smoothing said floating nodes failing to be on said paving row of said boundary.

53. The method of claim 51, wherein said step of paving boundary smoothing comprises the step of fixing nodes failing to be on said paving row of said boundary and smoothing said floating nodes on said paving row.

54. The method of claim 53, wherein said step of paving boundary smoothing comprises the step of modified isoparametric smoothing for adjusting a length and angle of said floating nodes from said fixed nodes.

55. The method of claim 43, wherein said step (b)(4) comprises the steps of interior node seaming, fixed node seaming and transition seaming.

56. The method of claim 55, wherein said step of interior node seaming comprises the step of combining the preceding and following nodes to form a seamed node of each node having said interior angle less than a first predetermined angle and the number of attached elements greater than or equal to 5 or said interior angle less than a second predetermined angle greater than said first predetermined angle.

57. The method of claim 55, wherein said step of fixed node seaming comprises the step of combining the preceding and following nodes of the fixed nodes of said paving row to form a seamed node when only one side of the quadrilateral element including the node is on an exterior boundary of the geometric region.

58. The method of claim 55, wherein said step of transition seaming comprises the steps of comparing the lengths of first and second elements sides of the quadrilateral elements and inserting a wedge element when the ratio of said first element side to said second element side or the ratio of said second element side to said first element side is greater than a predetermined value.

59. A method of automatically surface discretizing a geometric region having interior and exterior boundaries defining a geometric region interior into a plurality of quadrilateral elements, comprising the steps of:

inputting the permanent boundaries of the geometric region including an interior permanent boundary and an exterior permanent boundary; and iteratively layering rows of quadrilateral elements inward from said exterior permanent boundary to the geometric region interior and outward from said interior permanent boundary to the geometric region exterior to form a mesh of the quadrilateral elements defining the geometric region, said rows being alternatively layered outward from said interior boundary and inward from said exterior boundary until the entirety of the geometric region interior is discretized, respectively.

60. The method of claim 59, wherein the mesh of the quadrilateral elements is boundary sensitive.

61. The method of claim 59, wherein the mesh of the quadrilateral elements is orientation insensitive.

62. The method of claim 59, wherein substantially all of the quadrilateral elements formed by said mesh at permanent boundary comprise regular nodes.

* * * * *